(12) United States Patent
Gruhler et al.

(10) Patent No.: US 12,066,104 B2
(45) Date of Patent: Aug. 20, 2024

(54) SEALING ARRANGEMENT, BATTERY BOX OR CONTROL BOX, MOTOR VEHICLE AND METHOD FOR PRODUCING A SEALING ARRANGEMENT

(71) Applicant: ElringKlinger AG, Dettingen (DE)

(72) Inventors: Tobias Michael Gruhler, Pfullingen (DE); Stefan Dwenger, Reutlingen (DE); Robert Linkor, Eningen u.A. (DE)

(73) Assignee: ElringKlinger AG, Dettingen (DE)

( * ) Notice: Subject to any disclaimer, the term of this patent is extended or adjusted under 35 U.S.C. 154(b) by 116 days.

(21) Appl. No.: 17/685,673

(22) Filed: Mar. 3, 2022

(65) Prior Publication Data

US 2022/0333688 A1   Oct. 20, 2022

Related U.S. Application Data

(63) Continuation of application No. PCT/EP2020/074482, filed on Sep. 2, 2020.

(30) Foreign Application Priority Data

Sep. 6, 2019 (DE) .................. 10 2019 213 614.1

(51) Int. Cl.
*F16J 15/08* (2006.01)
(52) U.S. Cl.
CPC ................. *F16J 15/0818* (2013.01)
(58) Field of Classification Search
CPC ......... F16J 15/0818; F16J 15/06; F16J 15/067
See application file for complete search history.

(56) References Cited

U.S. PATENT DOCUMENTS

| | | | |
|---|---|---|---|
| 1,986,465 A | | 1/1935 | Dempsey |
| 3,175,832 A | * | 3/1965 | Carrell .................... F16L 23/22 |
| | | | 277/632 |
| 3,231,289 A | | 1/1966 | Carrell |

(Continued)

FOREIGN PATENT DOCUMENTS

| | | |
|---|---|---|
| DE | 200 19 818 U1 | 3/2001 |
| DE | 10 2005 013 813 A1 | 9/2006 |

(Continued)

*Primary Examiner* — Eugene G Byrd
(74) *Attorney, Agent, or Firm* — ASLAN LAW, P.C.

(57) ABSTRACT

In order to provide a seal arrangement, in particular for sealing a first fluid space from a second fluid space or a plurality of fluid spaces, which on the one hand can be produced in a simple and cost-effective manner and also allows reliable sealing of a first fluid space from a second fluid space, it is proposed that the seal arrangement comprises the following: A sealing element for arrangement between a first object and a second object, the sealing element comprising two or more sealing element components which can be or are connected directly or indirectly to one another and which each comprise a base body part and a resilient sealing body part arranged on the base body part, the base body parts of the sealing element components preferably forming a dimensionally stable base body of the sealing element, and the resilient sealing body parts of the sealing element components forming a resilient sealing body for providing a sealing function of the sealing element.

21 Claims, 20 Drawing Sheets

(56) References Cited

U.S. PATENT DOCUMENTS

| | | | | |
|---|---|---|---|---|
| 3,259,404 | A * | 7/1966 | Papenguth | F16J 15/104 |
| | | | | 285/212 |
| 3,738,670 | A * | 6/1973 | Jelinek | F16J 15/121 |
| | | | | 49/482.1 |
| 5,149,109 | A * | 9/1992 | Jelinek | F16J 15/127 |
| | | | | 403/381 |
| 5,236,203 | A * | 8/1993 | Uchida | F01M 11/0004 |
| | | | | 277/631 |
| 5,482,400 | A * | 1/1996 | Bavington | E02D 29/122 |
| | | | | 404/26 |
| 5,618,047 | A | 4/1997 | Belter | |
| 5,634,645 | A * | 6/1997 | Seki | F16J 15/104 |
| | | | | 277/654 |
| 5,906,377 | A * | 5/1999 | Salameh | F16B 3/00 |
| | | | | 277/632 |
| 5,975,539 | A * | 11/1999 | Ueda | F16J 15/123 |
| | | | | 277/593 |
| 6,761,360 | B2 * | 7/2004 | Hammi | B64D 37/005 |
| | | | | 277/630 |
| 9,759,327 | B2 * | 9/2017 | Olivas | F16J 15/022 |
| 2004/0172824 | A1 * | 9/2004 | Schenk | F16J 15/067 |
| | | | | 29/888.3 |
| 2008/0093808 | A1 * | 4/2008 | Quick | B23K 26/355 |
| | | | | 277/592 |
| 2014/0319782 | A1 * | 10/2014 | Mohammad | F16J 15/14 |
| | | | | 277/637 |
| 2017/0051830 | A1 * | 2/2017 | Olivas | F16J 15/022 |
| 2020/0340584 | A1 * | 10/2020 | Pham | F16J 15/122 |
| 2020/0386313 | A1 * | 12/2020 | Hwang | F16J 15/0818 |
| 2020/0408303 | A1 * | 12/2020 | Gruhler | F16J 15/0818 |

FOREIGN PATENT DOCUMENTS

| | | |
|---|---|---|
| DE | 20 2007 009 319 U1 | 10/2007 |
| DE | 10 2018 204 085 A1 | 9/2019 |
| DE | 20 2018 105 005 U1 | 9/2019 |
| FR | 2 659 122 A1 | 9/1991 |
| JP | 60049166 A * | 8/1983 |
| WO | WO 2019/175391 A1 | 9/2019 |

* cited by examiner

SEALING ARRANGEMENT, BATTERY BOX OR CONTROL BOX, MOTOR VEHICLE AND METHOD FOR PRODUCING A SEALING ARRANGEMENT

RELATED APPLICATION

This application is a continuation of international application No. PCT/EP2020/074482 filed on Sep. 2, 2020, and claims the benefit of German application No. 10 2019 213 614.1 filed on Sep. 6, 2019, which are incorporated herein by reference in their entirety and for all purposes.

FIELD OF DISCLOSURE

The present invention relates to a seal arrangement, in particular a seal arrangement for sealing a first fluid space from a second fluid space or a plurality of fluid spaces. The seal arrangement comprises a sealing element for arrangement between a first object and a second object.

BACKGROUND

So-called carrier gaskets or metal elastomer gaskets which are used for providing a seal between two components or objects are known from the prior art.

These carrier or metal-elastomer gaskets known from the prior art usually have an in particular metal base body and a resilient sealing body arranged on the base body. By means of such carrier or metal-elastomer gaskets, two objects can be connected to one another in a simple sealing manner in the region of a planar connecting surface, in which case it is preferably possible to avoid introducing a groove into the components for fastening a sealing element. Tolerance problems when introducing the groove therefore do not arise. In contrast to a liquid seal, which is often chosen when components that have a planar connecting surface are to be connected, carrier or metal-elastomer gaskets can also be dismantled comparatively easily.

In addition, objects to be connected to one another, in particular metal objects to be connected to one another, can be through-contacted through the metal base body of a carrier or metal-elastomer gasket. Increased electromagnetic compatibility (EMC) can thus be provided by means of the carrier or metal-elastomer gasket. As a result, carrier or metal-elastomer gaskets are growing in popularity.

The sealing bodies of the carrier or metal-elastomer gaskets are usually injection molded onto an in particular annular, preferably metal, base body in an injection molding process. The size of an injection molding tool to be used, in particular the size of a required injection molding machine, is determined, among other things, by the size or dimension of the base body.

So far it has not been possible, for example, to produce carrier or metal-elastomer gaskets for battery boxes in electric vehicles, since these cannot be produced in one piece in known injection molding tools and/or injection molding machines due to their size and/or dimensions.

SUMMARY OF THE INVENTION

The object of the present invention is therefore to provide a seal arrangement which on the one hand can be produced in a simple and cost-effective manner and also allows reliable sealing of a first fluid space from a second fluid space.

This object is achieved by a seal arrangement having the features of claim 1.

The sealing element of the seal arrangement comprises in particular two or more sealing element components which can be or are connected directly or indirectly to one another and which each comprise a base body part and a resilient sealing body part arranged on the base body part.

The sealing element components can in particular be connected directly or indirectly to one another in such a way that the sealing element components complement one another to form the sealing element. In particular, the sealing element components rest against one another at least in part, preferably with abutment, in a circumferential direction in particular in an abutment region between two sealing element components.

Within the context of this description and the accompanying claims, a direct connection of the sealing element components is understood to mean in particular that the sealing element components are or can be connected to one another without using additional components.

Within the context of this description and the accompanying claims, an indirect connection of the sealing element components is understood to mean in particular that the sealing element components are or can be connected to one another by means of one or more additional components.

For example, it is conceivable that the sealing element components are connected to one another indirectly via the first and/or the second object, in particular by arrangement of the sealing element components between the first and the second object.

It may be favorable, for example, if the sealing element components can be connected to one another indirectly by positioning the sealing element components relative to the first object and/or relative to the second object, for example by positioning the sealing element components on the first object and/or on the second object by means of one or more positioning projections.

The base body parts of the sealing element components form in particular a preferably dimensionally stable base body of the sealing element.

In particular, the base body parts of the sealing element components form a base body for providing a load-bearing function of the sealing element.

Within the context of this description and the accompanying claims, a load-bearing function is understood to mean in particular a transmission of compressive forces, in particular between two objects or components.

The resilient sealing body parts of the sealing element components preferably form a resilient sealing body for providing a sealing function of the sealing element.

The base body of the sealing element is preferably annular, in particular annularly closed, when the sealing element components are connected to one another.

The sealing element components preferably form segments of an annularly closed sealing element.

In particular, the interconnected sealing element components complement one another to form a closed annular shape.

Within the context of this description and the accompanying claims, an annular shape is understood to mean in particular a closed shape of the sealing element. The annular shape of the sealing element can in particular be a circular ring shape or a shape deviating from a circular ring shape.

Since the sealing element components can be connected to one another, with the base body parts forming a base body and with the sealing body parts forming a sealing body, the resilient sealing body parts can preferably be molded onto a base body part in an injection molding process due to the smaller size or dimension of the individual sealing element components. The individual sealing element components can then be connected to form a sealing element. This can make it possible in particular for the resilient sealing body parts to be able to be produced in a comparatively small injection molding tool and/or a comparatively small injection molding machine.

The base body and/or the base body parts are preferably made of an at least approximately inflexible or rigid material.

The sealing element and/or the base body of the sealing element are preferably flat.

The sealing element and/or the base body extend in particular at least approximately along a plane, in particular along a main extension plane, of the sealing element.

The resilient sealing body and/or the resilient sealing body parts are preferably produced by injection molding, by compression molding and/or by transfer compression molding.

In particular, the resilient sealing body and/or the resilient sealing body parts are injection molded onto the base body and/or onto the base body parts.

Within the context of this description and the accompanying claims, injection molding means in particular a connection of the base body parts to the sealing body parts, with the resilient sealing body parts being produced in an injection molding process in such a way that they are attached to the base body and/or to the base body parts.

The resilient sealing body and/or the resilient sealing body parts are in particular injection molded parts.

The sealing element is preferably a carrier gasket, in particular a plastics carrier gasket, and/or a metal-elastomer gasket.

The resilient sealing body preferably comprises one or more sealing lips.

It may be favorable if the sealing lips of the resilient sealing body are annularly closed.

For example, it is conceivable that a sealing lip, in particular an annularly closed sealing lip, of the resilient sealing body is arranged on an inner edge of the base body.

A sealing lip arranged on an inner edge of the base body is in particular a primary sealing lip.

A sealing lip of the resilient sealing body arranged on an inner edge of the base body forms in particular a main sealing region of the sealing element.

A main sealing function of the sealing element can preferably be provided by means of a sealing lip arranged on an inner edge of the base body.

Alternatively or additionally, it is conceivable that a sealing lip, in particular an annularly closed sealing lip, of the resilient sealing body is arranged on an outer edge of the base body.

A sealing lip arranged on an outer edge of the base body is in particular a secondary sealing lip.

A sealing lip arranged on an outer edge of the base body forms in particular an additional sealing region of the sealing element.

An additional sealing function of the sealing element can preferably be provided by means of a sealing lip arranged on an outer edge of the base body, in particular in addition to a main sealing function of a sealing lip arranged on an inner edge of the base body.

By means of a sealing lip arranged on an outer edge of the base body, sealing against splashing water can be implemented, for example.

The one or more sealing lips preferably protrude beyond the base body of the sealing element, in particular on both sides, in a direction extending perpendicularly to a main extension plane of the sealing element.

It may be favorable in particular if a sealing lip, in particular an annularly closed sealing lip, of the resilient sealing body is arranged on both an inner edge of the base body and an outer edge of the base body.

A sealing lip arranged on an inner edge of the base body preferably has, in a direction extending perpendicularly to a main extension plane of the sealing element, a height which is greater than a height of a sealing lip arranged on an outer edge of the base body in the direction extending perpendicularly to the main extension plane of the sealing element.

A resilient sealing body part of a sealing element component preferably comprises one or two sealing lip portions.

For example, it is conceivable that the resilient sealing body part comprises a sealing lip portion, which is arranged on an inner edge of the base body part of the relevant sealing element component.

Alternatively or additionally, it is conceivable that the resilient sealing body part comprises a sealing lip portion, which is arranged on an outer edge of the base body part of the relevant sealing element component.

It may be favorable if the sealing lip portions of the resilient sealing body parts of the sealing element components of the sealing element each form an annularly closed sealing lip of the resilient sealing body when the seal arrangement is in an assembled state.

In one embodiment of the invention, the sealing element components can be connected to one another in a puzzle-like and/or form-fitting manner, in particular for producing one or more annularly closed shapes of the base body.

The sealing element components can in particular be releasably connected.

The sealing element components can preferably be connected to one another by direct or indirect connection of the base body parts, in particular at an abutment region of the base body parts.

Within the context of this description and the accompanying claims, an indirect connection of the base body parts is understood to mean in particular a connection of the base body parts by means of resilient sealing body parts arranged on the base body parts.

Within the context of this description and the accompanying claims, a direct connection of the base body parts is understood to mean in particular a connection of the base body parts directly to one another, i.e., in particular no resilient sealing body part is required to connect the base body parts.

In one embodiment of the invention, the sealing element comprises a plurality of identical sealing element components and/or a plurality of identical base body parts and/or a plurality of identical resilient sealing body parts.

It is in particular conceivable that two or more, in particular all, sealing element components are completely identical. In particular, both the base body parts and the resilient sealing body parts are then also completely identical.

Alternatively, it is in particular possible for two or more, in particular all, base body parts to be identical, but for the resilient sealing body parts to be designed differently from one another.

Alternatively, it is possible for the base body parts to be designed differently, but with two or more, in particular all, resilient sealing body parts being identical.

Ideally, the number of different components required for the seal arrangement can thus be reduced overall, with the seal arrangement being able to be produced more cost-effectively overall. A seal arrangement can preferably be provided with a sealing element that can be produced according to a modular principle, so that sealing elements in different geometries can be implemented by means of a modular system.

In one embodiment of the invention, the base body parts each comprise one or more, in particular two, connecting portions for connecting the base body parts to one another.

The connecting portions are preferably formed in one piece with the base body parts.

The base body parts can preferably be connected in a form-fitting manner by means of the connecting portions.

In particular, the base body parts can be connected in a puzzle-like manner by means of the connecting portions.

The connecting portions are preferably designed to be complementary to one another in such a way that they engage in one another in a form-fitting manner when the base body parts are connected to one another.

In one embodiment of the invention, the base body parts can be connected to one another, in particular plug-connected, in a direction perpendicular to a main extension plane of the sealing element.

The base body parts can preferably be connected to one another in an assembly direction, which in particular extends perpendicularly to the main extension plane of the sealing element.

The connecting portions each have in particular one or more, in particular two, undercut portions.

The undercut portions are preferably designed in such a way that base body parts connected to one another are coupled, in particular form-fittingly connected, in the region of the connecting portions in a direction parallel to the main extension plane of the sealing element.

Base body parts connected to one another are preferably in particular form-fittingly anchored in the region of the connecting portions in a direction parallel to the main extension plane of the sealing element.

The connecting portions preferably each have a connecting portion geometry, with two connecting portions being designed to be complementary to one another in such a way that one connecting portion has a positive shape of the connecting portion geometry and one connecting portion has a negative shape of the connecting portion geometry.

The positive shape and the negative shape of the connecting portion geometry are preferably designed to be complementary to one another.

The positive shape and/or the negative shape of the connecting portion geometry is in particular a dovetail geometry.

In particular, it may be favorable if the connecting portions and/or the connecting portion geometry are symmetrical with respect to a plane of symmetry.

In particular, only two connecting portions of a seal arrangement correspond to one another in each case.

Preferably, in each case only two connecting portions are designed to be complementary to one another, i.e., they have a mutually complementary connecting portion geometry with a positive shape and a negative shape that is complementary thereto. In particular, different connecting portion geometries are provided. This prevents the base body parts and/or the sealing element components from being incorrectly connected to one another. A sealing element can thus preferably be provided which is easy to produce, in particular easy to assemble.

In one embodiment of the invention, each sealing element component comprises a one- piece resilient sealing body part and one or more base body parts, a plurality of base body parts of a sealing element component being connected to one another in particular by means of the one-piece resilient sealing body part of the relevant sealing element component.

Each sealing element component comprises in particular only a single one-piece resilient sealing body part.

All the base body parts of a relevant sealing element component are preferably connected to one another by means of the single one-piece resilient sealing body part.

A plurality of base body parts of a relevant sealing element component are connected to one another, for example, by injection molding the resilient sealing body part onto the base body parts.

Preferably, the base body parts of a sealing element component can be made smaller. In particular, the base body parts can thus be produced cost-effectively, for example by punching and/or injection molding.

In one embodiment of the invention, the resilient sealing body has one or more sealing lips, in particular a sealing lip arranged on an inner edge of the base body and/or a sealing lip arranged on an outer edge of the base body.

In one embodiment of the invention, the sealing lip arranged on an inner edge of the base body has a first sealing lip height in a direction perpendicular to a main extension plane of the sealing element, and the sealing lip arranged on an outer edge of the base body has a second sealing lip height in a direction perpendicular to a main extension plane of the sealing element, the first sealing lip height being greater than the second sealing lip height.

In one embodiment of the invention, the resilient sealing body parts each comprise one or two coupling portions for coupling mutually abutting or mutually overlapping resilient sealing body parts.

It may be favorable if the coupling portions of the resilient sealing body parts of two sealing element components connected to one another can be placed against one another, in particular can be connected to one another in a sealing manner.

The one or the two coupling portions of a resilient sealing body part comprise in particular a central coupling portion and one or more, in particular two, edge coupling portions.

By means of the one or more edge coupling portions, a particularly tight coupling of the sealing lip portions of the resilient sealing body parts of two sealing element components connected to one another can preferably be implemented.

For example, it is conceivable that the central coupling portion is arranged between two edge coupling portions.

The coupling portion of a resilient sealing body part comprises, for example, an inner edge coupling portion, a central coupling portion, and an outer edge coupling portion.

In one embodiment of the invention, the one or more, in particular the two, edge coupling portions of a coupling portion each comprise one or more additional sealing lips, in particular for sealing in the region of an abutting joint.

It may be favorable if only the two edge coupling portions of a single coupling portion of a resilient sealing body part of a relevant sealing element component comprise an additional sealing lip.

In particular, the two edge coupling portions of another coupling portion of the resilient sealing body part of the relevant sealing element component do not comprise an additional sealing lip.

Improved sealing in the region of the edge coupling portions can preferably be achieved by means of the one or more additional sealing lips.

Sealing lip portions of different sealing element components of the sealing element can preferably be coupled to one another by means of the edge coupling portions, in particular in a sealing manner.

In particular, it is conceivable that sealing lip portions of a sealing lip arranged on an inner edge of the base body can be coupled to one another by means of the inner edge coupling portion.

It may also be favorable if sealing lip portions of a sealing lip arranged on an outer edge of the base body can be coupled to one another by means of the outer edge coupling portion.

It may be favorable if the resilient sealing body parts have, in the coupling portion, in particular in the central coupling portion, in a direction extending perpendicularly to a main extension plane of the sealing element, a height which is greater than a base body height of the base body in the direction extending perpendicularly to the main extension plane of the sealing element.

For example, it is conceivable that the resilient sealing body parts have, in the coupling portion, in particular in the central coupling portion, in the direction extending perpendicularly to the main extension plane of the sealing element, a height which is at least approximately 5%, preferably at least approximately 10%, greater than the base body height of the base body in the direction extending perpendicularly to the main extension plane of the sealing element.

For example, it is also conceivable that the resilient sealing body parts have, in the coupling portion, in particular in the central coupling portion, in the direction extending perpendicularly to the main extension plane of the sealing element, a height which is at most approximately 20%, preferably at most approximately 15%, greater than the base body height of the base body in the direction extending perpendicularly to the main extension plane of the sealing element.

The resilient sealing body parts preferably have, in the central coupling portion in the direction extending perpendicularly to the main extension plane of the sealing element, a height which is smaller than a height of one or more sealing lips of the resilient sealing body in the direction extending perpendicularly to the main extension plane of the sealing element.

In particular, the resilient sealing body parts have, in the central coupling portion in the direction extending perpendicularly to the main extension plane of the sealing element, a height which is smaller than a height of the resilient sealing body parts in the edge coupling portions.

A height of the resilient sealing body parts in the central coupling portion in the direction extending perpendicularly to the main extension plane of the sealing element is preferably smaller than a height of a sealing lip arranged on an inner edge of the base body and/or smaller than a height of a sealing lip arranged on an outer edge of the base body.

A height of the resilient sealing body parts in a direction extending perpendicularly to the main extension plane of the sealing element in the one or more edge coupling portions preferably corresponds to a height of a relevant sealing lip.

The coupling portions are designed in particular in such a way that the resilient sealing body parts rest against one another in a sealing manner in the region of the coupling portions when the sealing element components and/or the base body parts are connected to one another, in particular when the sealing element is arranged in a sealing manner between a first object and a second object.

Preferably, the coupling portions each have a coupling geometry.

In particular, the coupling portions of two resilient sealing body parts each have a mutually complementary coupling geometry.

The fact that the resilient sealing body parts have, in the coupling portion, in a direction extending perpendicularly to a main extension plane of the sealing element, in particular a height which is greater than a base body height of the base body in the direction extending perpendicularly to the main extension plane of the sealing element can preferably make it possible for the resilient sealing body parts of two interconnected sealing element components to be at least partially compressible when the sealing element is arranged between two objects.

In particular, the coupling geometries of the coupling portions of two resilient sealing body parts can be placed against one another in a sealing manner.

The coupling geometry of the coupling portions has in particular no undercuts in the assembly direction of the sealing components and/or the base body parts, i.e., in a direction perpendicular to a main extension plane of the sealing element. Preferably, when the base body parts are assembled or connected, the resilient sealing body parts can therefore be placed against one another in a sealing manner in a direction perpendicular or inclined, i.e., transverse, to the main extension plane.

Preferably, the base body parts with resilient sealing body parts arranged thereon can be connected by means of the connecting portions in a direction perpendicular to the main extension plane, without a connection of the base body parts being impeded by undercuts of the coupling geometry.

The coupling geometry is, for example, a chamfer or an inclined surface, i.e., a surface arranged obliquely to the main extension plane.

Alternatively or additionally, it is conceivable that the coupling geometry is stepped or corrugated.

In one embodiment of the invention, the resilient sealing body is arranged on one edge or on a plurality of edges of the base body.

The resilient sealing body is preferably arranged on an inner edge surrounded by the base body and/or on an outer edge surrounding the base body.

In the case of a base body of the sealing element that is annularly closed in the assembled state of the seal arrangement, the resilient sealing body is preferably arranged on an inner edge of the base body, in particular on a circumferential inner edge of the base body, but in particular is interrupted in the region of the base body parts and/or the resilient sealing body parts.

The resilient sealing body arranged on an inner edge of the base body comprises or forms in particular a primary sealing lip of the resilient sealing body arranged on the inner edge of the base body.

It may be favorable if, in the case of a base body of the sealing element that is annularly closed in the assembled state of the seal arrangement, the resilient sealing body is arranged on an outer edge of the base body, in particular on a circumferential outer edge of the base body, but in particular is interrupted in the region of the base body parts and/or the resilient sealing body parts.

A resilient sealing body arranged on an outer edge of the base body comprises or forms in particular a secondary sealing lip of the resilient sealing body arranged on the outer edge of the base body.

In particular, it is conceivable that the resilient sealing body is also arranged on an outer edge of the base body surrounding the base body of the sealing element.

The resilient sealing body parts are preferably arranged on an edge of the base body parts, in particular by injection molding (so-called edge molding).

In one embodiment of the invention, the resilient sealing body parts each extend along an edge of a base body part, in particular along an edge of an abutment region of the base body parts.

The resilient sealing body parts preferably also extend in particular along an edge of the connecting portions of the base body parts. In particular, a course of the resilient sealing body parts in the region of a connecting portion follows the connecting portion geometry.

The resilient sealing body parts are preferably arranged on a positive shape and/or on a negative shape of the connecting portion geometry of the connecting portions.

In particular, a resilient sealing body part is arranged on both the positive shape and the negative shape in each case of the connecting portion geometry of the connecting portions.

Alternatively, it is conceivable that a resilient sealing body part is arranged only on the positive shape or only on the negative shape of the connecting portion geometry of the connecting portions.

The resilient sealing body parts are arranged in particular on an abutment region of the base body parts and preferably form an abutting joint there.

Within the context of this description and the accompanying claims, an abutment region of the base body parts is understood to mean in particular a joint region of the base body parts.

It is thus conceivable that in the abutment region of the base body parts, a resilient sealing body part is arranged on only one base body part.

Alternatively, it is conceivable that a resilient sealing body part is arranged on each of the two base body parts in the abutment region of the base body parts, with the two resilient sealing body parts having a mutually complementary coupling geometry.

For example, it is conceivable that each base body part is assigned a resilient sealing body part. The number of sealing body parts thus corresponds in particular to the number of base body parts.

In one embodiment of the invention, the resilient sealing body parts of the sealing element components each comprise one or more, for example two, positioning projections.

The positioning projections of a resilient sealing body part of a sealing element component preferably protrude beyond the base body of the sealing element component, in particular in a direction extending perpendicularly to a main extension plane of the sealing element.

All the positioning projections of a resilient sealing body part of a sealing element component preferably protrude beyond the base body of the sealing element component on the same side of the sealing element component.

It may be favorable if the sealing element components and/or the sealing element can be positioned relative to the first object and/or relative to the second object by means of the positioning projections.

Preferably, the sealing element components are movable in a direction extending parallel to a main extension plane of the sealing element, in order to position said sealing element components relative to the first object and/or relative to the second object and/or relative to further sealing element components due to the positioning projections of the resilient sealing body part of a relevant sealing element component.

In one embodiment of the invention, the base body has a constant base body height in a direction perpendicular to the main extension plane of the sealing element.

The base body height is in particular uniform, i.e., the base body preferably has a uniform height in the height direction.

For example, the base body has a base body height in the range of from 1 to 3 mm, in particular in the range of from 1.5 to 2 mm.

In one embodiment of the invention, the resilient sealing body comprises an elastomer material or is made of an elastomer material, the elastomer material preferably being an ethylene acrylate rubber (AEM), an ethylene propylene diene rubber (EPDM), an acrylate rubber (ACM), a fluorine rubber (FKM), a hydrogenated acrylonitrile butadiene rubber (HNBR), a liquid silicone, in particular liquid silicone rubber (LSR), or a silicone rubber (MVQ), in particular a vinyl methyl polysiloxane.

It may be favorable if the elastomer material comprises a mixture of one or more of the rubber materials mentioned above.

In one embodiment of the invention, the base body is made of a metal base body material or comprises a metal base body material, the metal base body material being in particular steel or aluminum.

Alternatively, it is also conceivable that the base body is made of a plastics base body material or comprises a plastics base body material. For example, it may be favorable if the plastics base body material is a fiber-reinforced plastics material, for example a glass-fiber-reinforced plastics material.

The plastics base body material preferably comprises or is made of polyphenylene sulfide (PPS), in particular fiber-reinforced polyphenylene sulfide (PPS), polyamide 6 (PA6) and/or polyamide 6.6 (PA6.6).

In one embodiment of the invention, the base body and/or the base body parts are produced by punching and/or by laser cutting and/or by water jet cutting and/or by manual cutting or in that the base body and/or the base body parts are produced by injection molding.

If the base body is made of a plastics base body material or comprises a plastics base body material, it is conceivable that the base body, in particular the base body parts of the base body, are produced from a plastics base body material in a first production step by means of an injection molding process, with the resilient sealing body, in particular the sealing body parts of the resilient sealing body, subsequently being injection molded onto the base body.

For example, it is conceivable that the sealing element components of the sealing element are produced in a two-component injection molding process.

In particular, the base body parts are first produced from a first plastics material by means of an injection molding process, with the sealing body parts made of a second plastics material then being injection molded onto the base body parts.

It is conceivable that the base body parts and the resilient sealing body parts are produced in the same injection molding tool.

It may also be favorable if the base body parts and the resilient sealing body parts are produced in injection molding tools that are different from one another.

It is also conceivable that the base body parts are produced in a first cavity of an injection molding tool, with the resilient sealing body parts then being produced in a second cavity of the same injection molding tool, for example by changing one or more mold parts of the injection molding tool.

Alternatively or additionally, it is in particular conceivable that the base body and/or the base body parts are produced by injection molding, in particular if the base body is made of a plastics material.

The base body and/or the base body parts are preferably produced entirely from sheet metal material by punching and/or laser cutting.

In particular, no further method steps for producing the base body and/or the base body parts are carried out.

The connecting portions of the base body parts are therefore preferably also produced by punching and/or laser cutting.

The invention also relates to a battery or control box.

Within the context of this description and the accompanying claims, a battery box is understood to mean in particular a housing for one or more batteries, in particular batteries of an electric motor vehicle.

Within the context of this description and the accompanying claims, a control box is understood to mean in particular a housing for one or more control components and/or one or more control devices.

Another object of the invention is therefore to provide a battery or control box in which a sealing element is mounted simply and securely and a first fluid space can thus be reliably sealed from a second fluid space.

This object is achieved by a battery or control box having the features of claim 19.

The battery or control box comprises a seal arrangement according to any of claims 1 to 18.

The sealing element is arranged in particular in a sealing manner between a box base part and a box cover.

The invention also relates to a motor vehicle.

Another object of the invention is therefore to provide a motor vehicle in which a sealing element is mounted simply and securely and a first fluid space can thus be reliably sealed from a second fluid space.

This object is achieved by a motor vehicle having the features of claim 20.

The motor vehicle comprises one or more seal arrangements according to any of claims 1 to 18, in particular a battery or control box according to claim 19.

The invention also relates to a method for producing a seal arrangement for sealing a first fluid space from a second fluid space or a plurality of fluid spaces.

The object of the invention is therefore to provide a method for producing a seal arrangement with which a seal arrangement can be produced in a simple and cost-effective manner and which allows reliable sealing of a first fluid space from a second fluid space.

This object is achieved by a method having the features of claim 21.

The method comprises in particular the following: providing a plurality of sealing element components, each of which comprises a base body part and a resilient sealing body part arranged on the base body part; direct or indirect connection, in particular puzzle-like connection and/or form-fitting connection, of the sealing element components to one another.

The sealing element components are preferably connected directly or indirectly to one another in such a way that the sealing element components complement one another to form the sealing element.

It may be favorable if the sealing element components rest against one another at least in part in a circumferential direction, in particular in an abutment region between two sealing element components.

It may also be favorable if the sealing element components rest against one another with abutment in a circumferential direction, in particular in an abutment region between two sealing element components.

If the sealing element components are connected to one another indirectly by means of one or more additional components, it can be provided that the sealing element components that are indirectly connected to one another do not undercut one another in an abutment region. The sealing element components are in particular indirectly connected to one another in a form-fitting manner.

It may be favorable if the connected sealing element components form a preferably closed, in particular annularly closed, sealing element.

In particular, the method steps are carried out in the specified order.

Each individual sealing element component provided is preferably smaller and/or shorter than the sealing element which is formed by the sealing element components in the connected state of the sealing element components.

It may be favorable if one or more, in particular all, provided sealing element components each have smaller dimensions in a main extension plane than the finished sealing element when this is formed in the connected state of the sealing element components.

It may be favorable if the dimensions of one or more, in particular all, provided sealing element components are smaller in one, two or all three spatial directions than the dimensions of the sealing element as a whole when this is formed by the sealing element components in the connected state of the sealing element components.

In one embodiment of the method, the sealing element components are produced as components which are separate from one another, a resilient sealing body part being molded onto one or more base body parts in an injection molding process, or a resilient sealing body part being connected to one or more base body parts by means of compression molding or by means of compression transfer molding.

When producing the base body parts, connecting portions are preferably produced for the form-fitting connection of the base body parts.

The base body and/or the base body parts are produced in particular by punching and/or by laser cutting, in particular from a sheet metal material.

The resilient sealing body parts are preferably injection molded onto an edge of the base body parts.

Further preferred features and/or advantages of the invention are the subject matter of the following description and embodiments illustrated in the drawings.

The same or functionally equivalent elements are provided with the same reference signs in all figures.

DETAILED DESCRIPTION OF THE DRAWINGS

Figure 1:
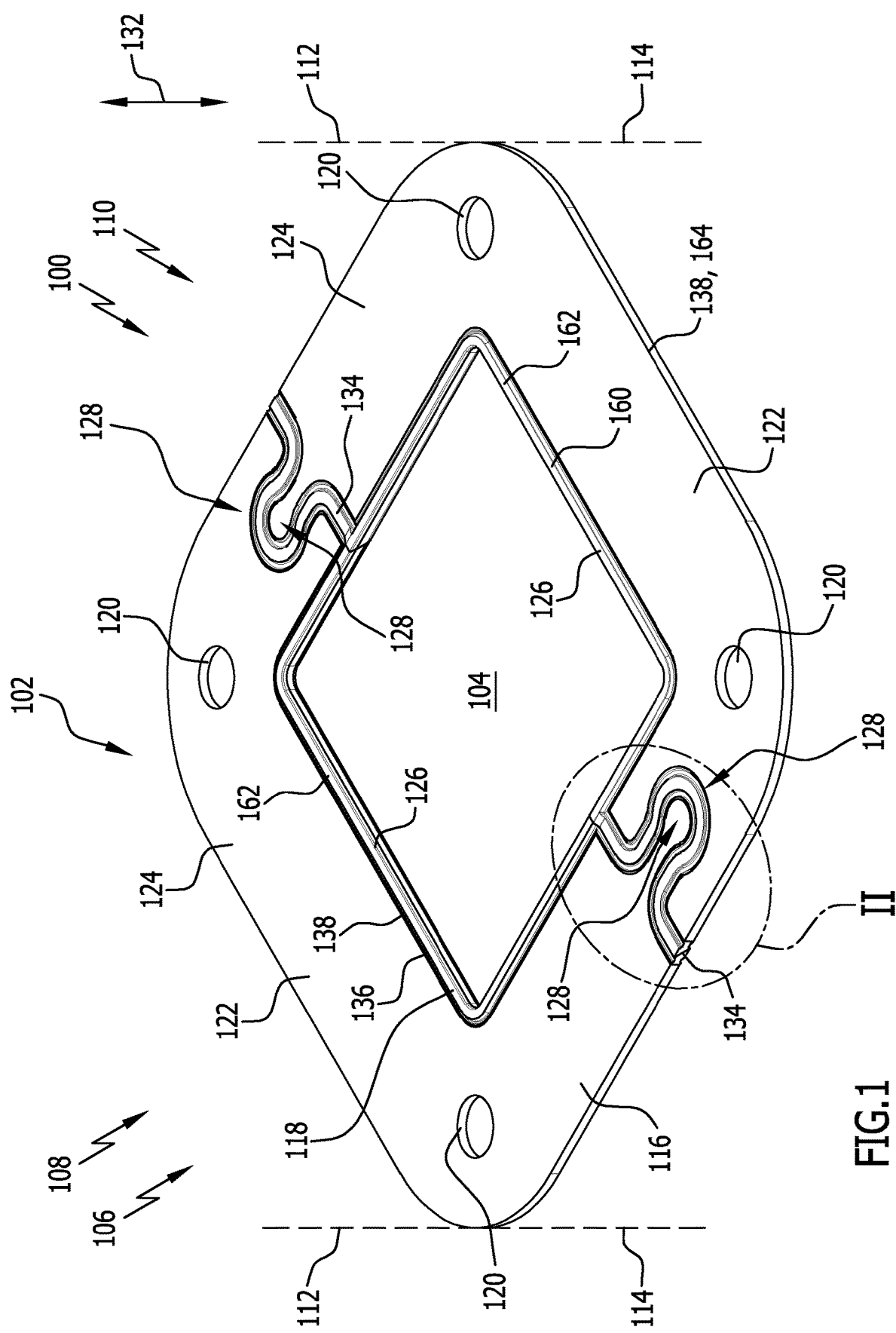
FIG. 1 is a schematic perspective representation of a seal arrangement, which comprises an embodiment of a sealing element.

FIG. 1 shows a seal arrangement designated as a whole by 100.

The seal arrangement 100 is used in particular to seal a first fluid space 102 from a second fluid space 104, for example in a battery or control box 106 of a motor vehicle 108, in particular an electric motor vehicle.

The seal arrangement 100 comprises an embodiment of a sealing element 110 shown in FIGS. 1 to 8 for arrangement between a first object 112, for example a box lid of the battery or control box 106, and a second object 114, for example a box base part of the battery or control box 106.

The sealing element 110 comprises a preferably dimensionally stable base body 116 and a resilient sealing body 118 arranged on the base body 116.

The sealing element 110 is thus in particular a so-called carrier gasket, in particular a plastics carrier gasket, and/or a so-called metal-elastomer gasket.

On the base body 116, the sealing element 110 comprises a total of four through-openings 120 through each of which a connecting element, in particular a screw, can be inserted to connect the first object 112 to the second object 114.

The sealing element 110 comprises two sealing element components 122 which can be or are, as shown in FIG. 1, connected directly to one another.

The sealing element components 122 each comprise a base body part 124 and a resilient sealing body part 126 arranged on the base body part 124.

The base body parts 124 of the sealing element components 122 form the base body 116 and thus provide a load-bearing function of the sealing element 110.

The resilient sealing body parts 126 of the sealing element components 122 form the resilient sealing body 118 and thus provide a sealing function of the sealing element 110.

The base body parts 124 of the base body 116 each comprise in particular two connecting portions 128 for connecting the base body parts 124 to one another.

Figure 4:
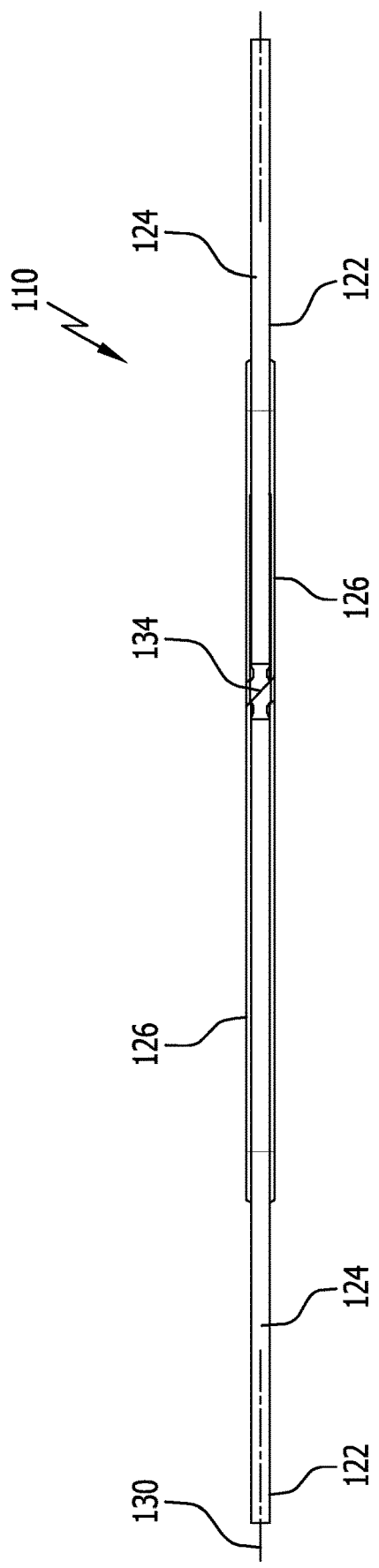
FIG. 4 is a schematic side view of the embodiment of the sealing element from FIG. 3 in the viewing direction of arrow 4 in FIG. 3.

The base body parts 124 can preferably be connected to one another, in particular plug-connected, in a direction perpendicular to a main extension plane 130 of the sealing element 110 shown in FIG. 4, in particular in an assembly direction 132.

The resilient sealing body 118 and/or the resilient sealing body parts 126 preferably comprise an elastomer material 133 or are made of an elastomer material 133. The elastomer material 133 is in particular an ethylene acrylate rubber (AEM). Alternatively or additionally, the elastomer material 133 is an ethylene propylene diene rubber (EPDM), an acrylate rubber (ACM), a fluorine rubber (FKM), a hydrogenated acrylonitrile butadiene rubber (HNBR), a liquid silicone, in particular liquid silicone rubber (LSR), or a silicone rubber (MVQ), in particular a vinyl methyl polysiloxane.

The base body 116 and/or base body parts 124 are made in particular from a metal base body material 135 or comprise a metal base body material 135. The metal base body material 135 is in particular steel or aluminum.

Alternatively or additionally, it is conceivable that the base body 116 and/or the base body parts 124 are made of a plastics base body material or comprise a plastics base body material.

The base body 116 and/or the base body parts 124 are preferably produced entirely by punching and/or laser cutting from a metal base body material 135, for example sheet metal material, so that in particular no further method steps for the production of the base body 116 and/or the base body parts 124 need to be carried out.

The connecting portions 128 of the base body parts 124 are preferably also produced by punching and/or laser cutting.

During the production of the embodiment of the sealing element 110 shown in FIGS. 1 to 8, the resilient sealing body parts 126 of the resilient sealing body 118 are preferably each injection molded onto a base body part 124 in each case in an injection molding process. When the resilient sealing body parts 126 are injection molded onto the base body parts 124, the resilient sealing body parts 126 of different sealing element components 122 are in particular not connected to one another.

In the injection molding process, in particular only the single resilient sealing body parts 126 are injection molded onto the base body parts 124 and the sealing element components 122 are thus formed.

In the embodiment of the sealing element 110 shown in FIGS. 1 to 8, the sealing element components 122 are already connected to one another by means of the connecting portions 128.

The base body 116 of the sealing element 110 is preferably annular, in particular annularly closed.

Since the base body 116 and/or the base body parts 124 are made in particular from an at least approximately inflexible or rigid material, preferably from a metal base body material 135, the base body 116 can in particular provide the load-bearing function of the sealing element 110.

As can be clearly seen in FIGS. 1 and 4 to 8, the sealing element 110 and/or the base body 116 are preferably flat.

The sealing element 110 and/or the base body 116 extend in particular at least approximately along the main extension plane 130 (cf. FIG. 4).

In order to produce the annularly closed shape of the base body 116 shown in FIGS. 1 to 8, the sealing element components 122 can be connected to one another, in particular in a puzzle-like and/or form-fitting manner.

A puzzle-like connection of the sealing element components 122 is achieved in particular by the connecting portions 128 of the base body parts 124.

The sealing element components 122, which can in particular be releasably connected to one another, can preferably be connected to one another directly or indirectly, in particular at an abutment region 134 of the base body parts 124.

In the embodiment of the sealing element 110 shown in FIGS. 1 to 8, the base body parts 124 are connected to one another indirectly via the resilient sealing body parts 126 arranged on the base body parts 124.

For this purpose, the resilient sealing body parts 126 are preferably not injection molded onto only one peripheral inner edge 136 of the base body 116.

Rather, the resilient sealing body parts 126 are also injection molded onto an edge 138 of the base body 116 or the base body parts 124 in the region of the connecting portions 128.

However, it is also conceivable to connect the base body parts 124 directly to one another in the abutment region 134 and thus to provide the resilient sealing body parts 126 only on the inner edge 136 of the annularly closed base body 116.

FIGS. 1 to 8 show that the base body parts 124 can be connected to one another by means of the connecting portions 128, preferably in a puzzle-like and/or form-fitting manner.

The connecting portions 128 are in particular designed to be complementary in such a way that the connecting portions 128 and/or the resilient sealing body parts 126 arranged thereon engage in one another in a form-fitting manner when the base body parts 124 are connected to one another in the assembly direction 132.

In order to connect the base body parts 124 to one another, the connecting portions 128 each have in particular two undercut portions 140.

Figure 3:
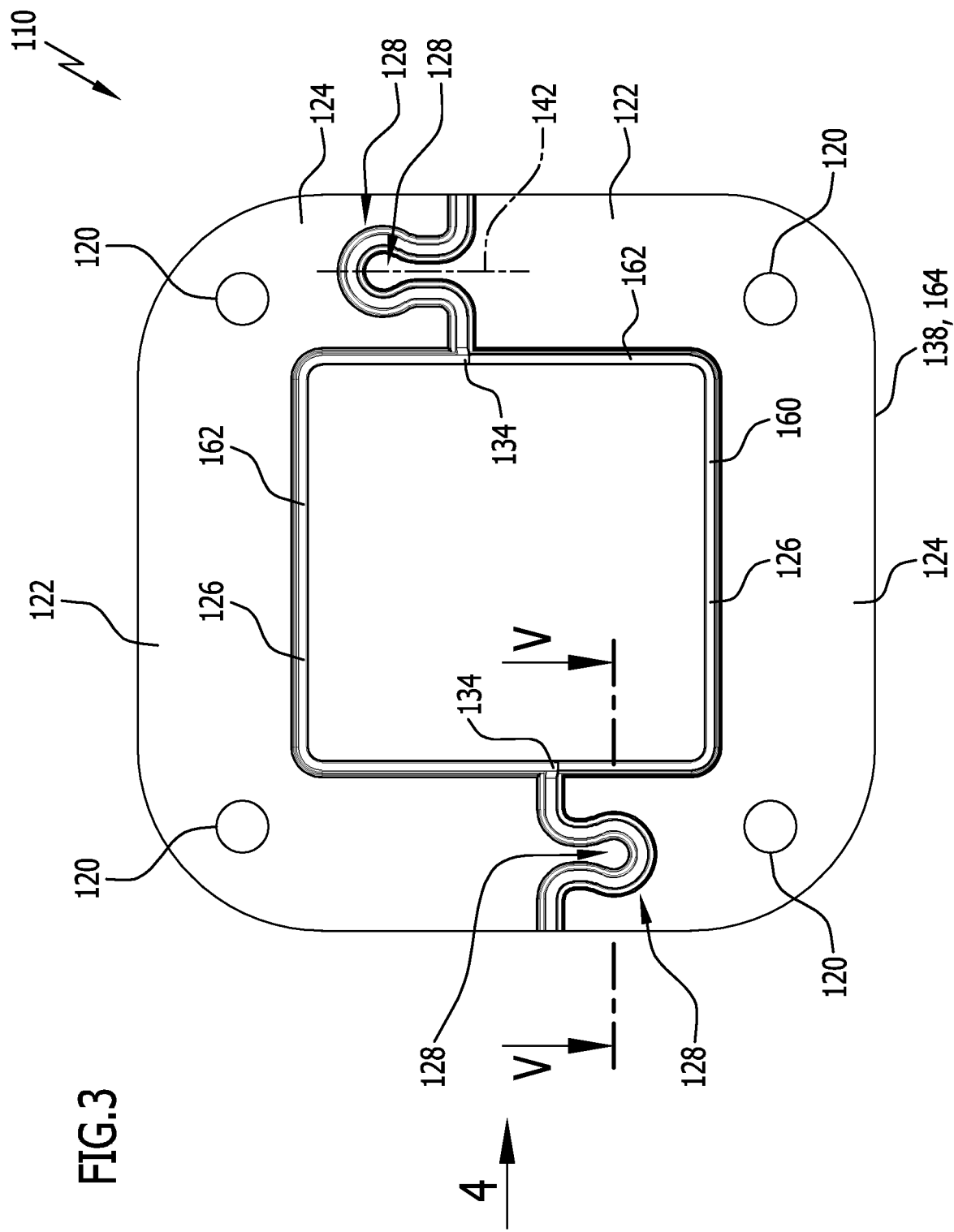
FIG. 3 is a schematic plan view from above of the embodiment of the sealing element from FIG. 1.

As can also be seen in FIG. 3, the connecting portions 128 are preferably symmetrical with respect to a plane of symmetry 142.

The undercut portions 140 are in particular arranged and designed in such a way that base body parts 124 connected to one another are coupled, in particular form-fittingly connected, in the region of the connecting portions 128 in a direction parallel to the main extension plane 130 of the sealing element 110.

For this purpose, the undercut portions 140 undercut one another in a direction extending parallel to the plane of symmetry 142.

Base body parts 124 connected to one another are therefore in particular form-fittingly anchored in the region of the connecting portions 128 in a direction parallel to the main extension plane 130 of the sealing element 110.

The connecting portions 128 preferably each have a connecting portion geometry 144.

Figure 2:
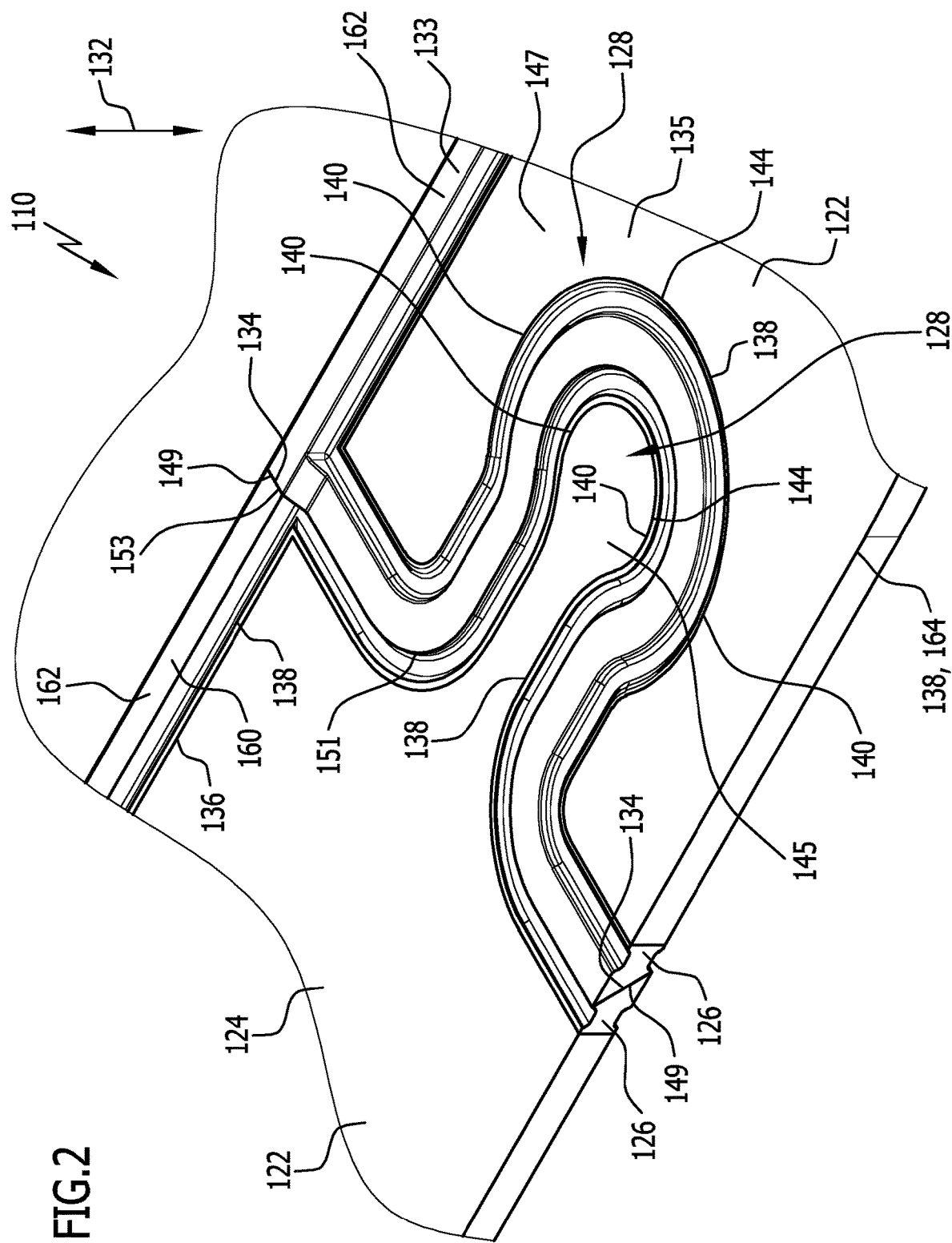
FIG. 2 is an enlarged representation of the region II in FIG. 1.

Two connecting portions 128 are in particular designed to be complementary to one another in such a way that one connecting portion 128 has a positive shape 145 of the connecting portion geometry 144 and one connecting portion 128 has a negative shape 147 of the connecting portion geometry 144 (cf. FIG. 2).

In the embodiment of the sealing element 110 shown in FIGS. 1 to 8, the connecting portion geometry 144 is designed in particular in a puzzle-like manner.

Alternatively, it is conceivable that the connecting portion geometry 144, i.e., the positive shape 145 and/or the negative shape 147, have in particular a dovetail geometry.

In order to be able to facilitate assembly of the sealing element 110, in particular only two connecting portions 128 correspond to one another, i.e., only two connecting portions 128 each have a mutually complementary connecting portion geometry 144.

In particular, only one connecting portion geometry 144 is provided for sealing element components 122 and/or base body parts 124 to be connected, i.e., the positive shape 145 and negative shape 147 of the connecting portions 128 are designed to complement one another. Sealing element components 122 and/or base body parts 124 can thus in particular not be connected to one another incorrectly.

As can also be seen in FIGS. 1 to 8, the resilient sealing body parts 126 are preferably interrupted in the abutment region 134 and form an abutting joint 149 there (cf. FIG. 2).

The resilient sealing body parts 126 therefore each extend in particular along an edge 138 of a relevant base body part 124.

As mentioned above, in the embodiment of the sealing element 110 shown in FIGS. 1 to 8, the resilient sealing body parts 126 extend along the inner edge 136 and along an edge 138 of the connecting portions 128 of the base body parts 124.

In particular, a course of the resilient sealing body parts in the region of the connecting portions 128 follows the connecting portion geometry 144.

In the embodiment of the sealing element 110 shown in FIGS. 1 to 8, the resilient sealing body parts 126 are arranged on both the positive shape 145 and the negative shape 147 of the connecting portion geometry 144 of the connecting portions 128, i.e., a resilient sealing body part 126 is arranged on both the positive shape 145 and the negative shape 147.

Alternatively, it is conceivable that a resilient sealing body part 126 is arranged only on the positive shape 145 or only on the negative shape 147 of the connecting portion geometry 144 of the connecting portions 128.

If a resilient sealing body part 126 is arranged on each of the two base body parts 124 in the abutment region 134 of the base body parts 124, the resilient sealing body parts 126 each comprise in particular a coupling portion 146 for coupling resilient sealing body parts 126 that rest against or overlap one another.

Figure 5:
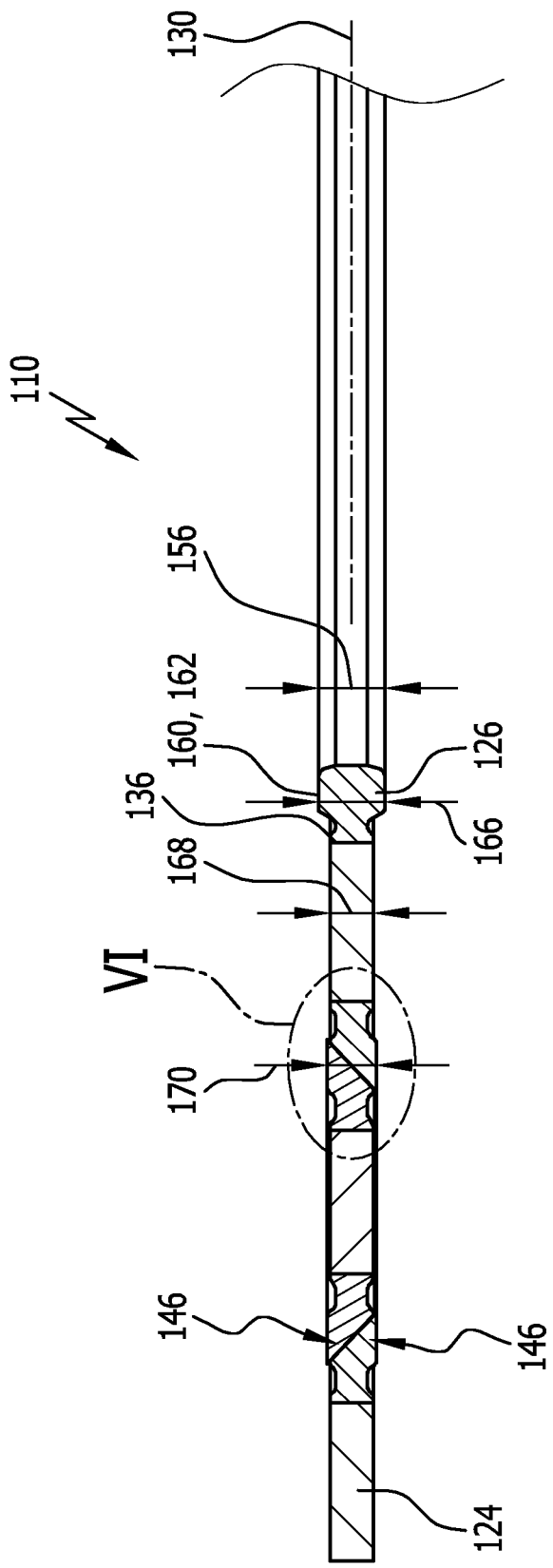
FIG. 5 is a schematic section through the embodiment of the sealing element from FIG. 3 along the line V-V in FIG. 3.
Figure 6:
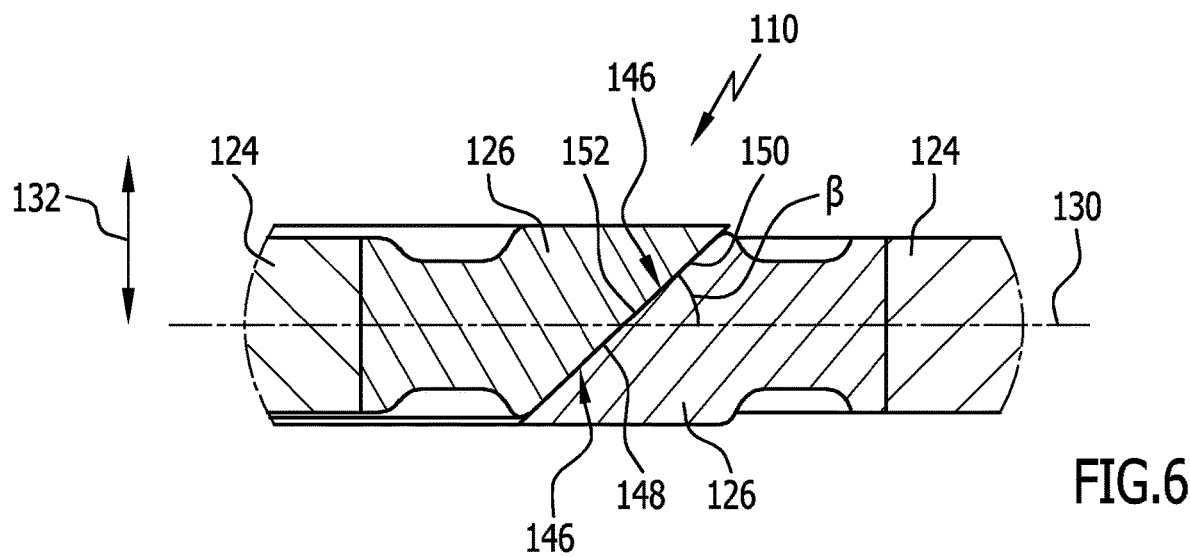
FIG. 6 is an enlarged representation of the region VI from FIG. 5 with a first embodiment of a coupling portion.
Figure 7:
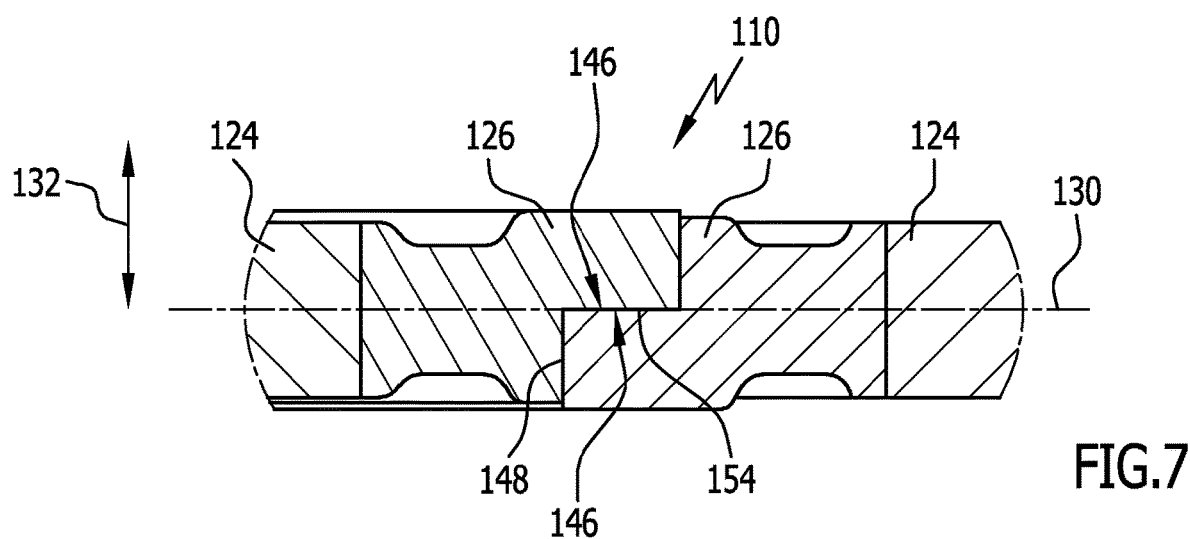
FIG. 7 is a representation, corresponding to FIG. 6, of a second embodiment of the coupling portion.
Figure 8:
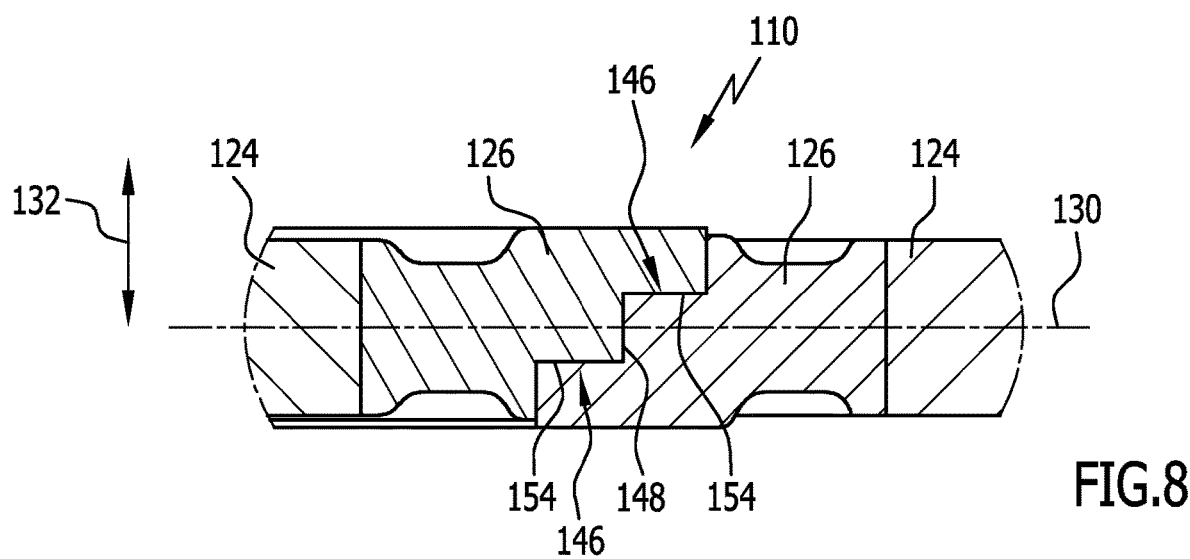
FIG. 8 is a representation, corresponding to FIG. 6, of a third embodiment of the coupling portion.
Figure 9:
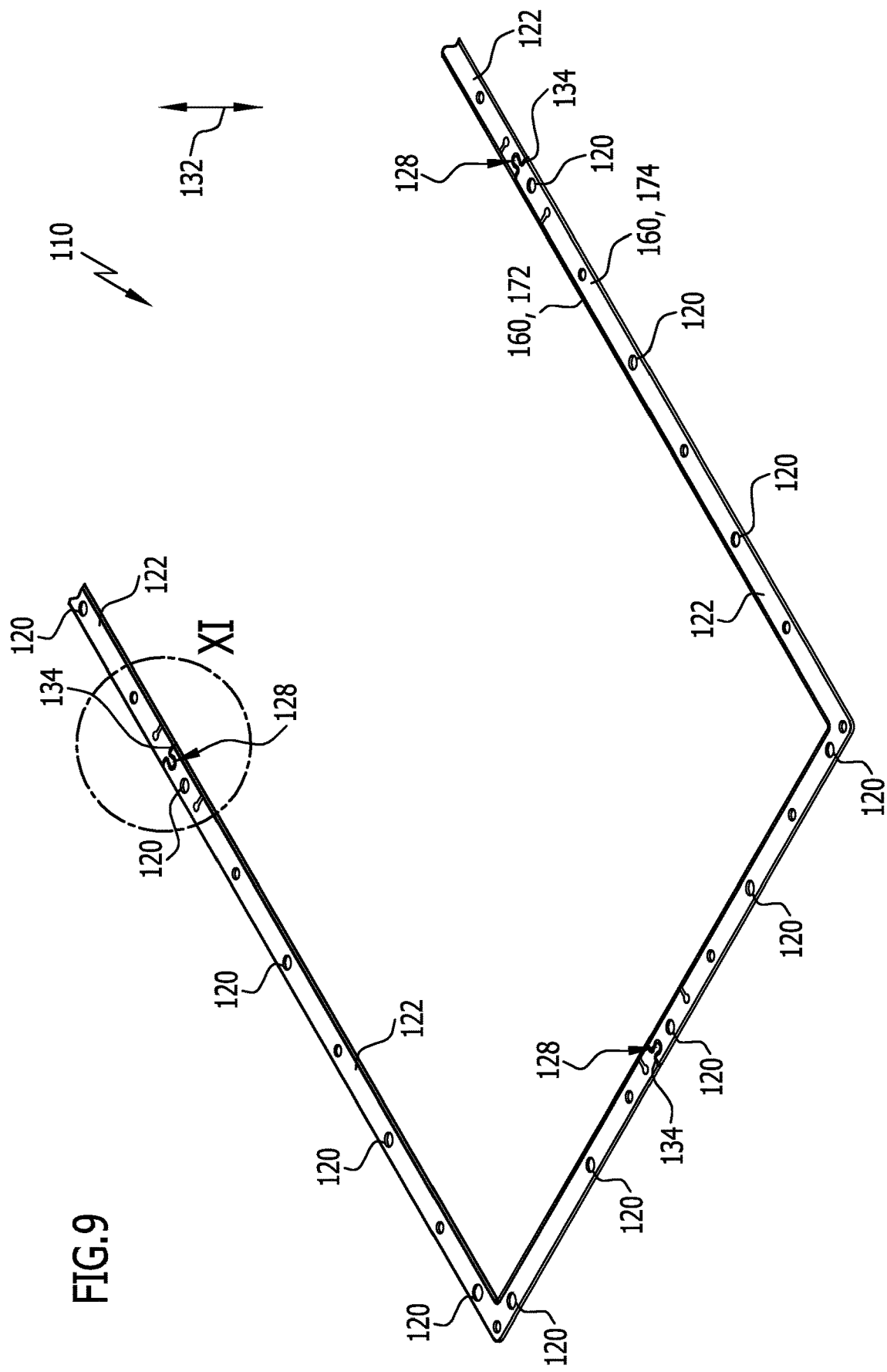
FIG. 9 is a schematic perspective representation of a section of a further embodiment of a sealing element of a seal arrangement from above.
Figure 10:
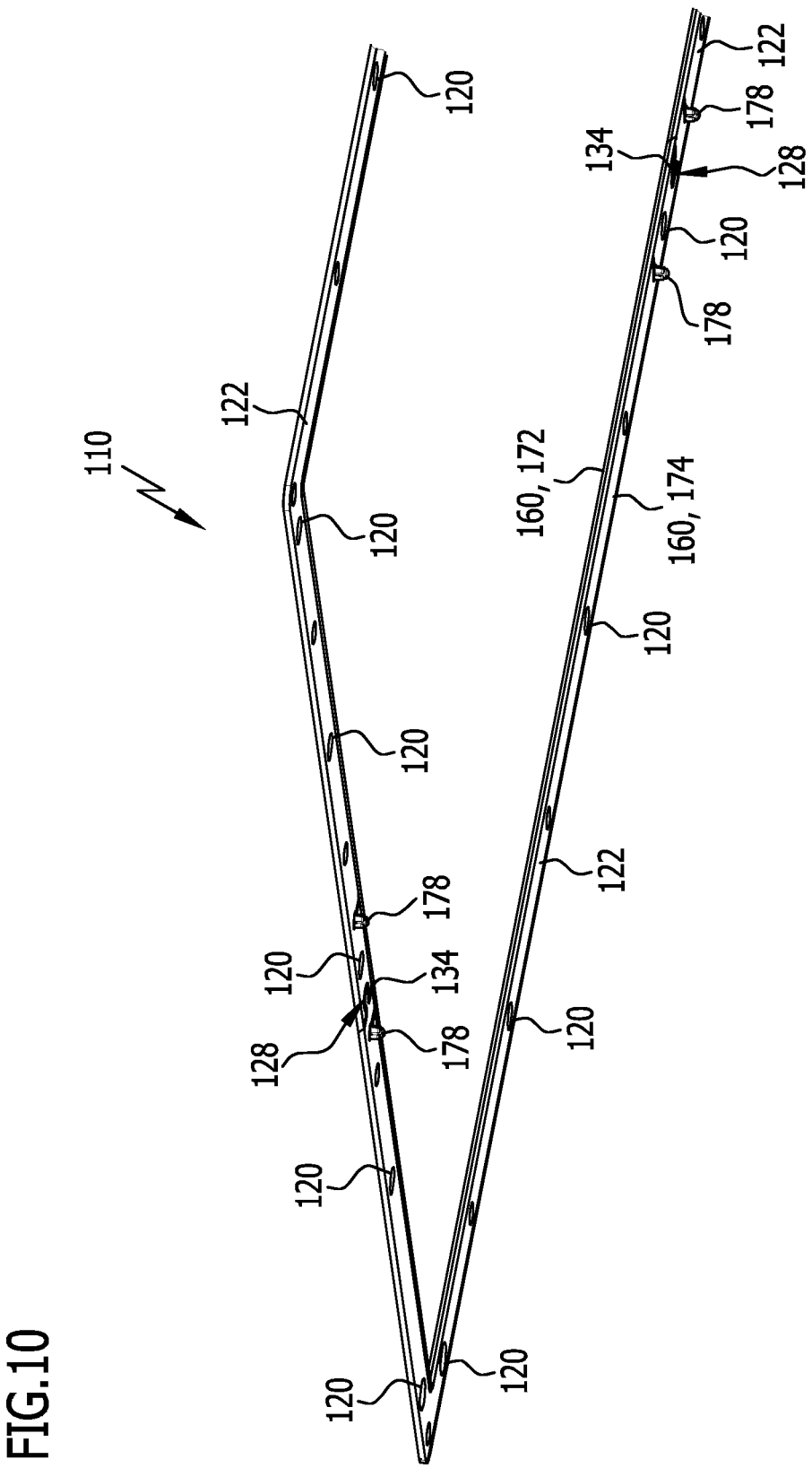
FIG. 10 is a schematic perspective representation of a section of the embodiment of the sealing element from FIG. 9 from below.
Figure 11:
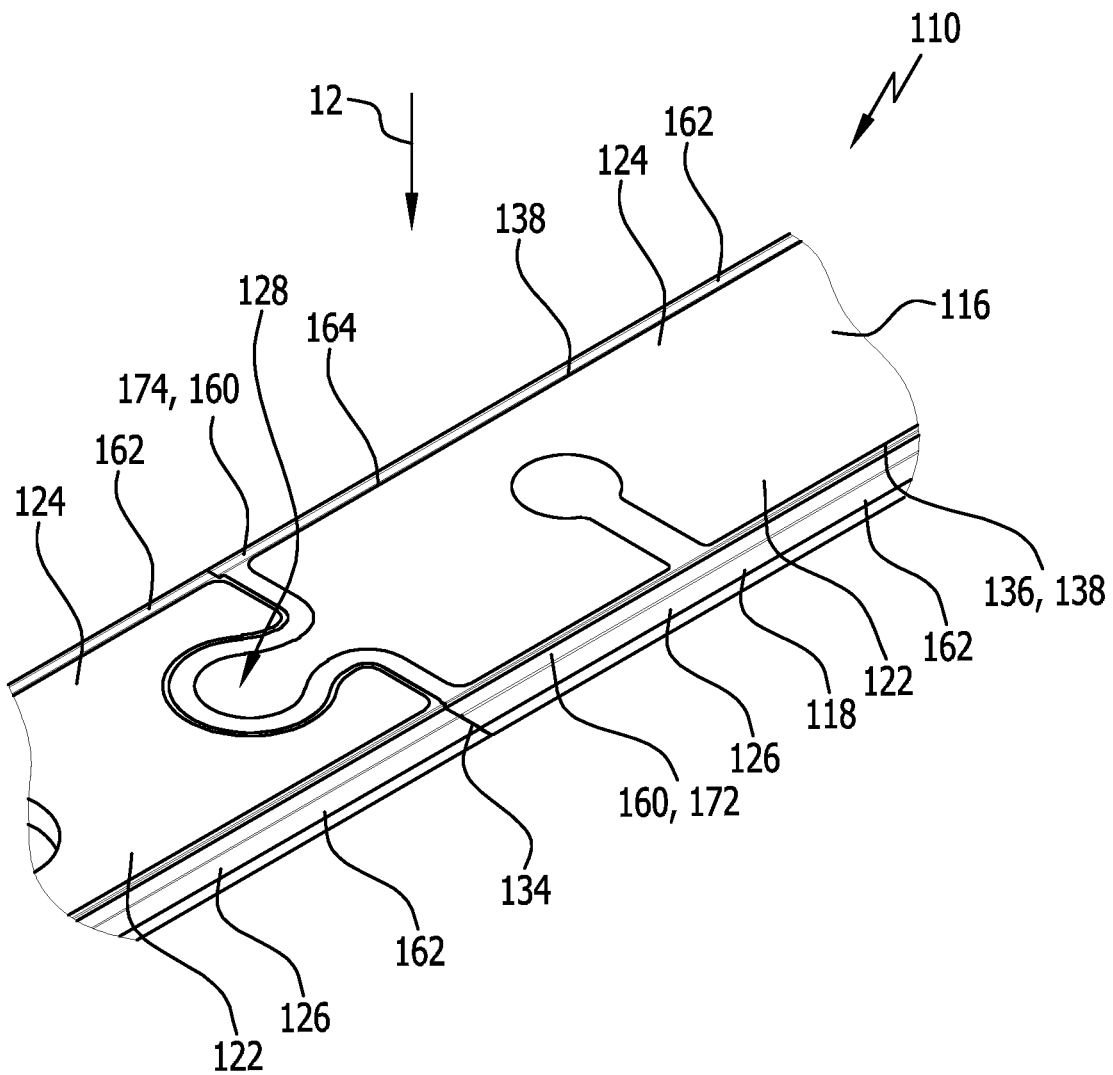
FIG. 11 is an enlarged representation of the region XI in FIG. 9.
Figure 12:
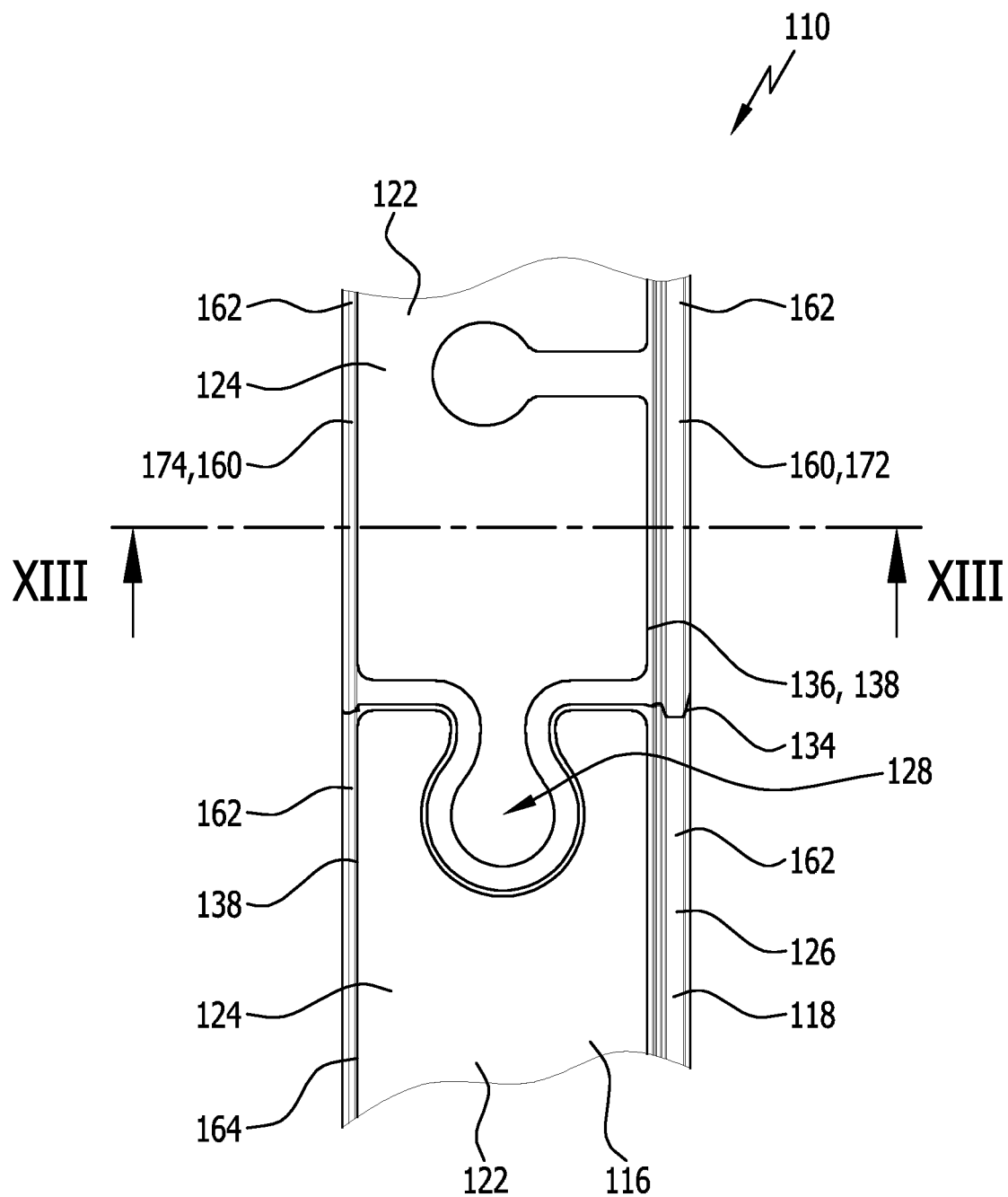
FIG. 12 is a schematic top view of the embodiment of the sealing element from FIG. 9 in the viewing direction of arrow 12 in FIG. 11.
Figure 13:
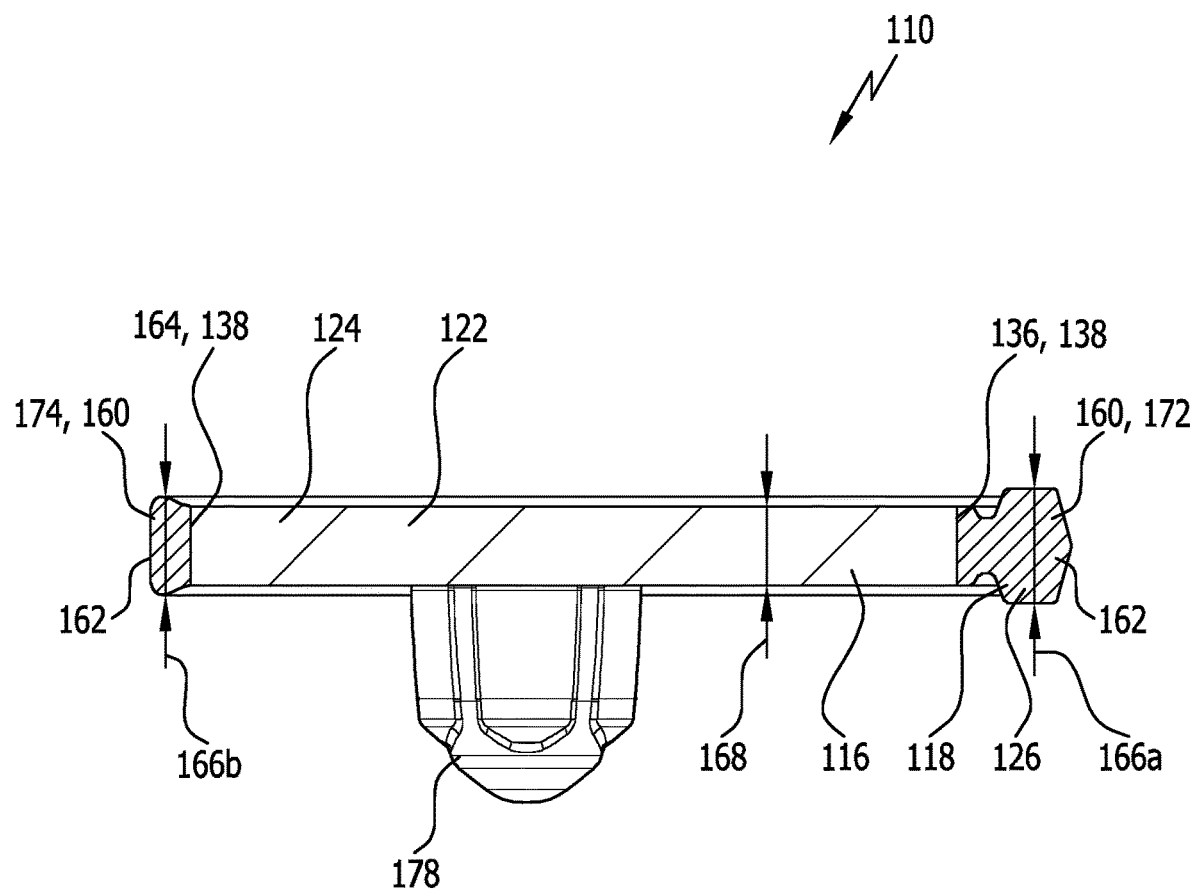
FIG. 13 is a schematic section through the embodiment of the sealing element from FIG. 9 along the line XIII-XIII in FIG. 12.
Figure 14:
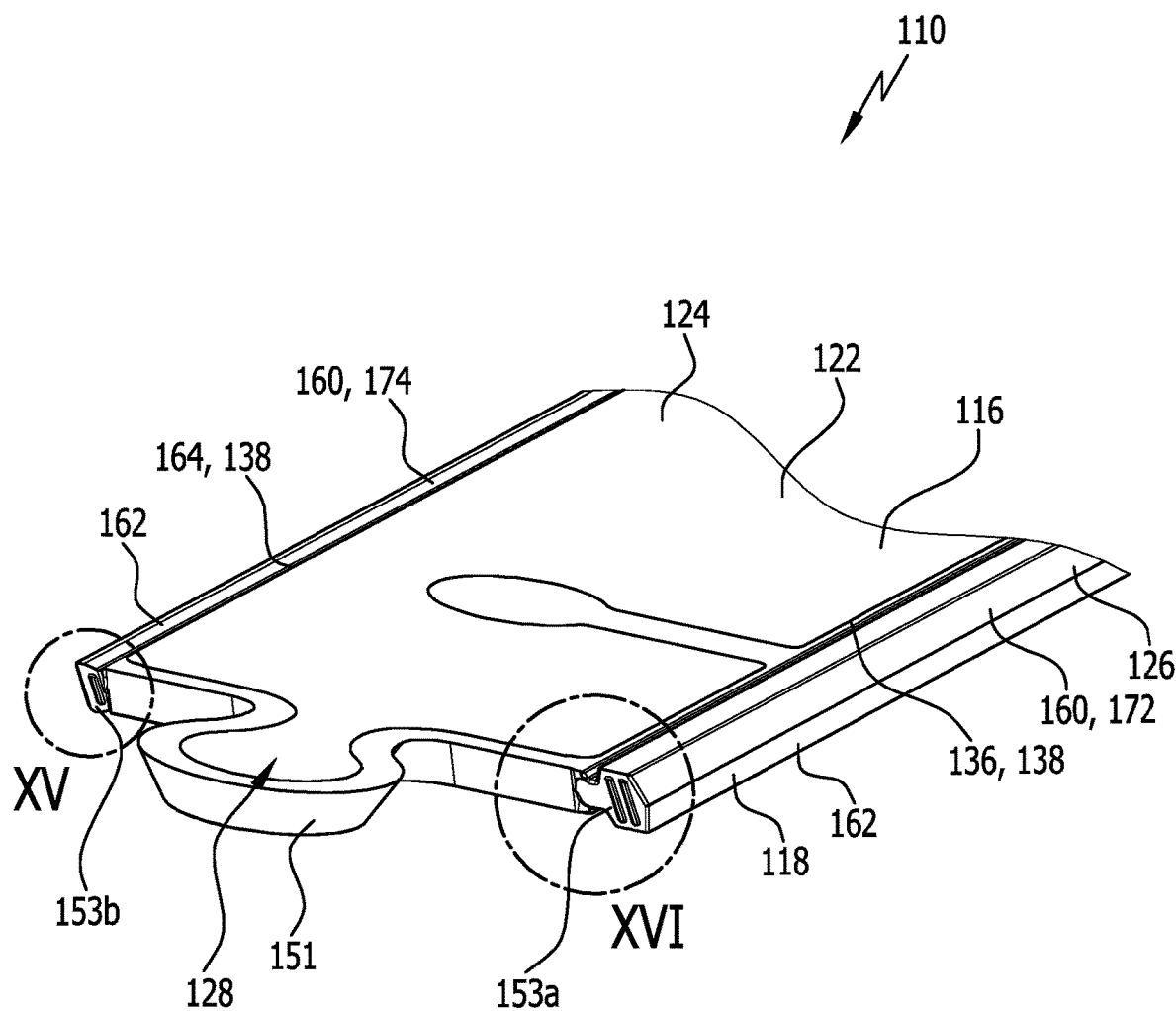
FIG. 14 is a schematic perspective representation of a coupling portion of a sealing element component of the embodiment of the sealing element from FIG. 9.
Figure 15:
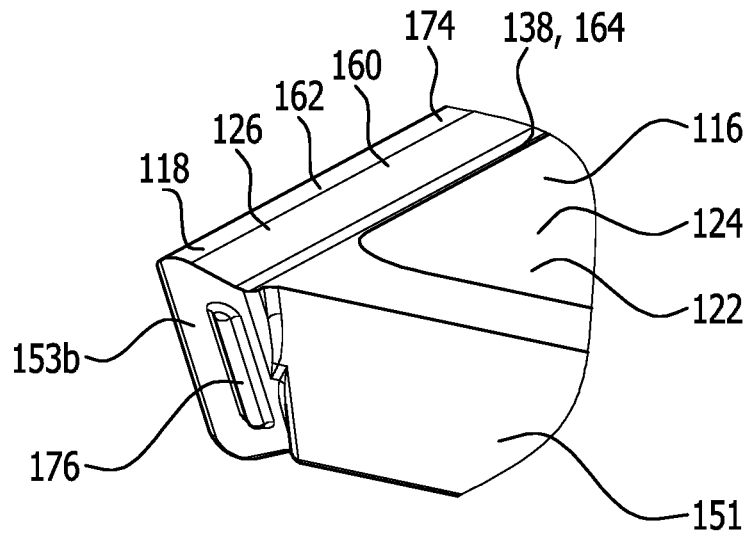
FIG. 15 is an enlarged representation of the region XV in FIG. 14.
Figure 16:
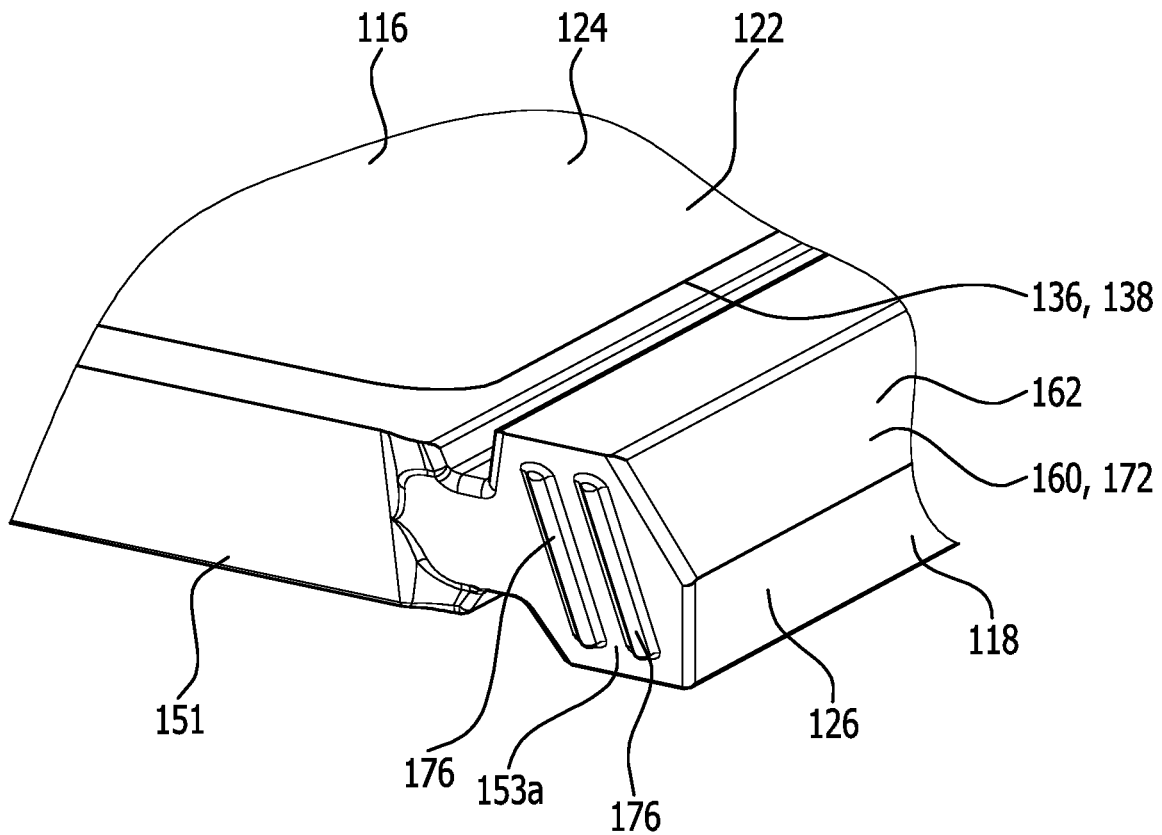
FIG. 16 is an enlarged representation of the region XVI in FIG. 14.
Figure 17:
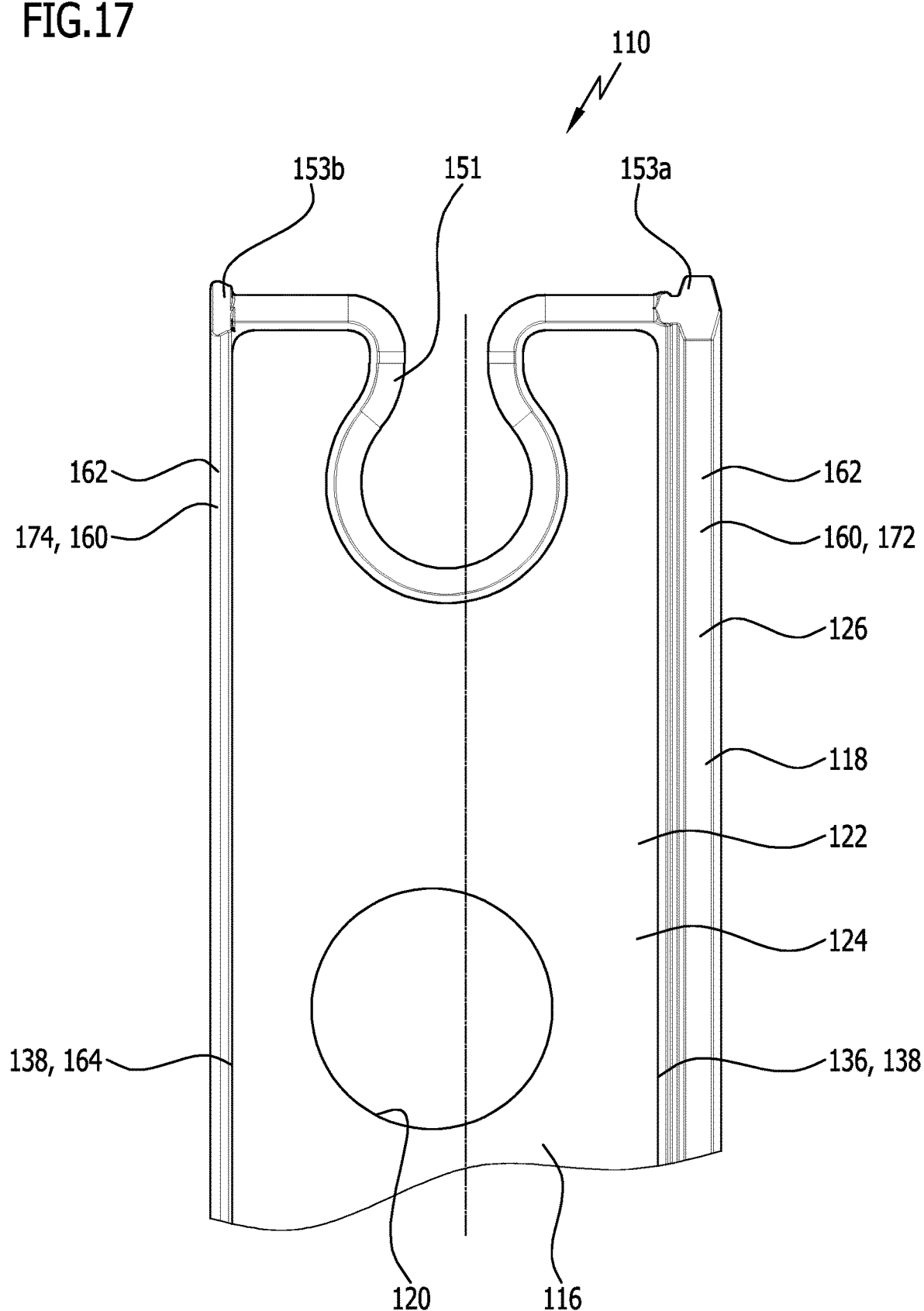
FIG. 17 is a schematic plan view of a further coupling portion of a sealing element component of the embodiment of the sealing element from FIG. 9.
Figure 18:
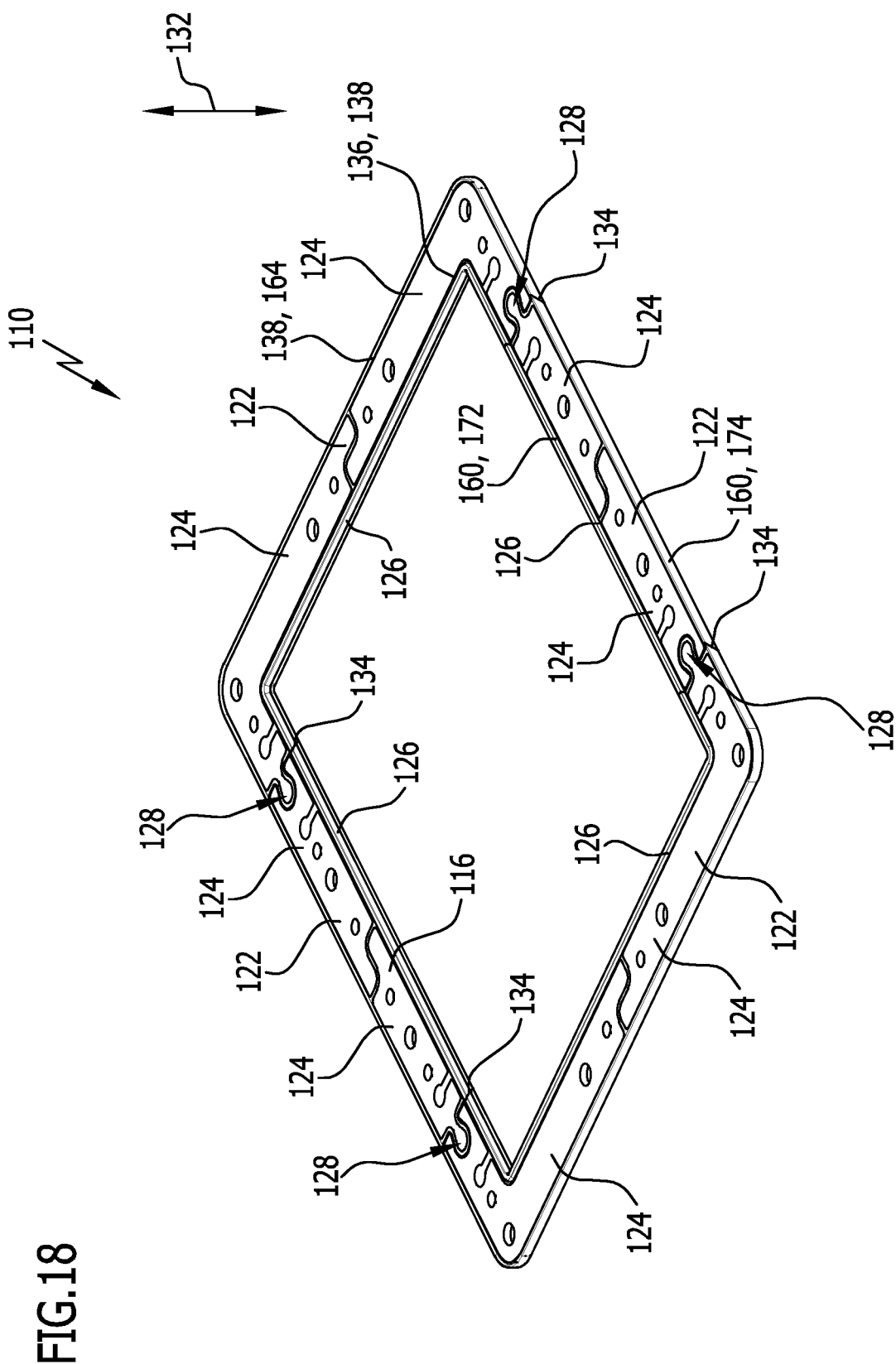
FIG. 18 is a schematic perspective representation of a further embodiment of a sealing element of a seal arrangement from above.
Figure 19:
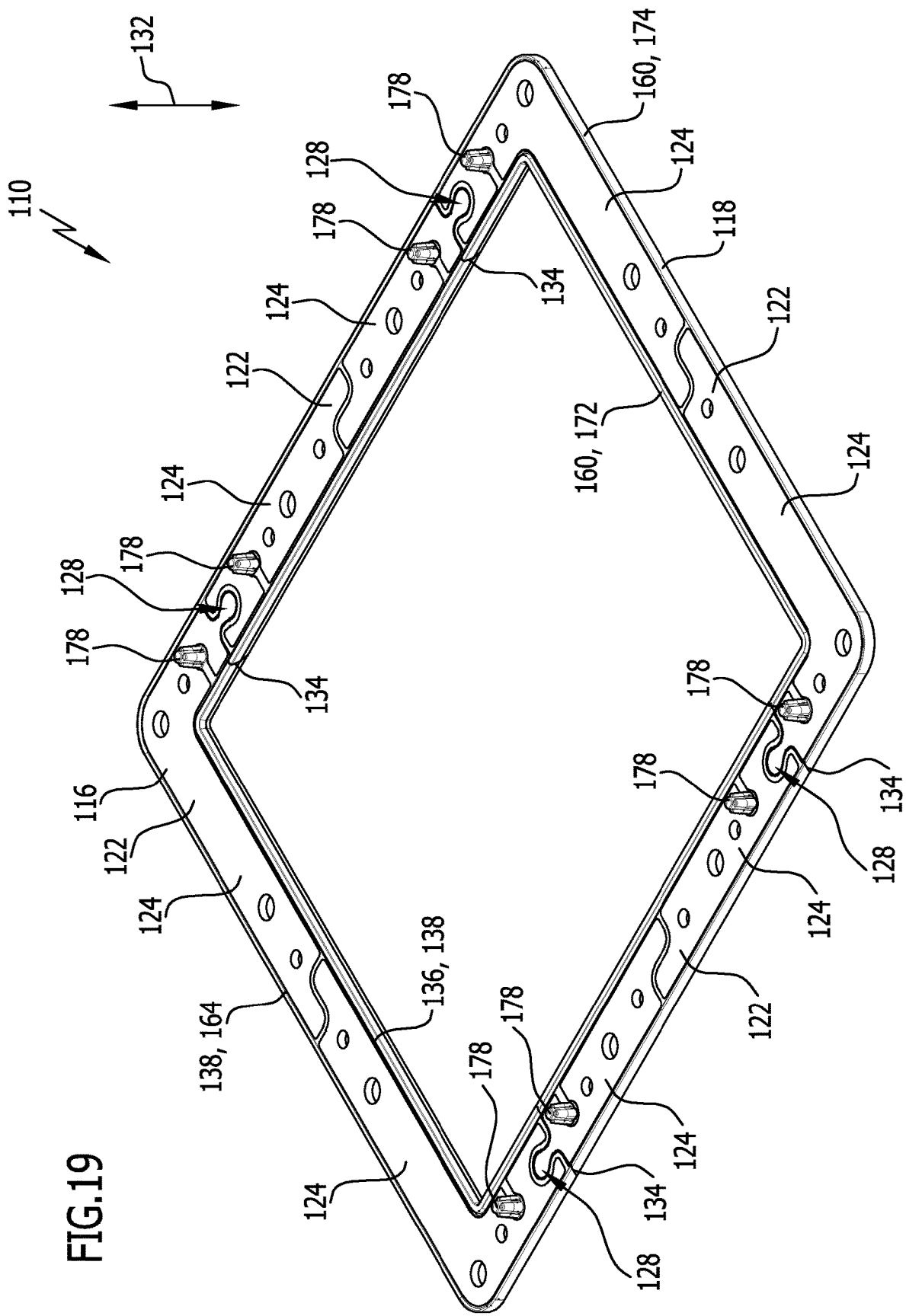
FIG. 19 is a schematic perspective representation of the embodiment of the sealing element from FIG. 18 from below.
Figure 20:
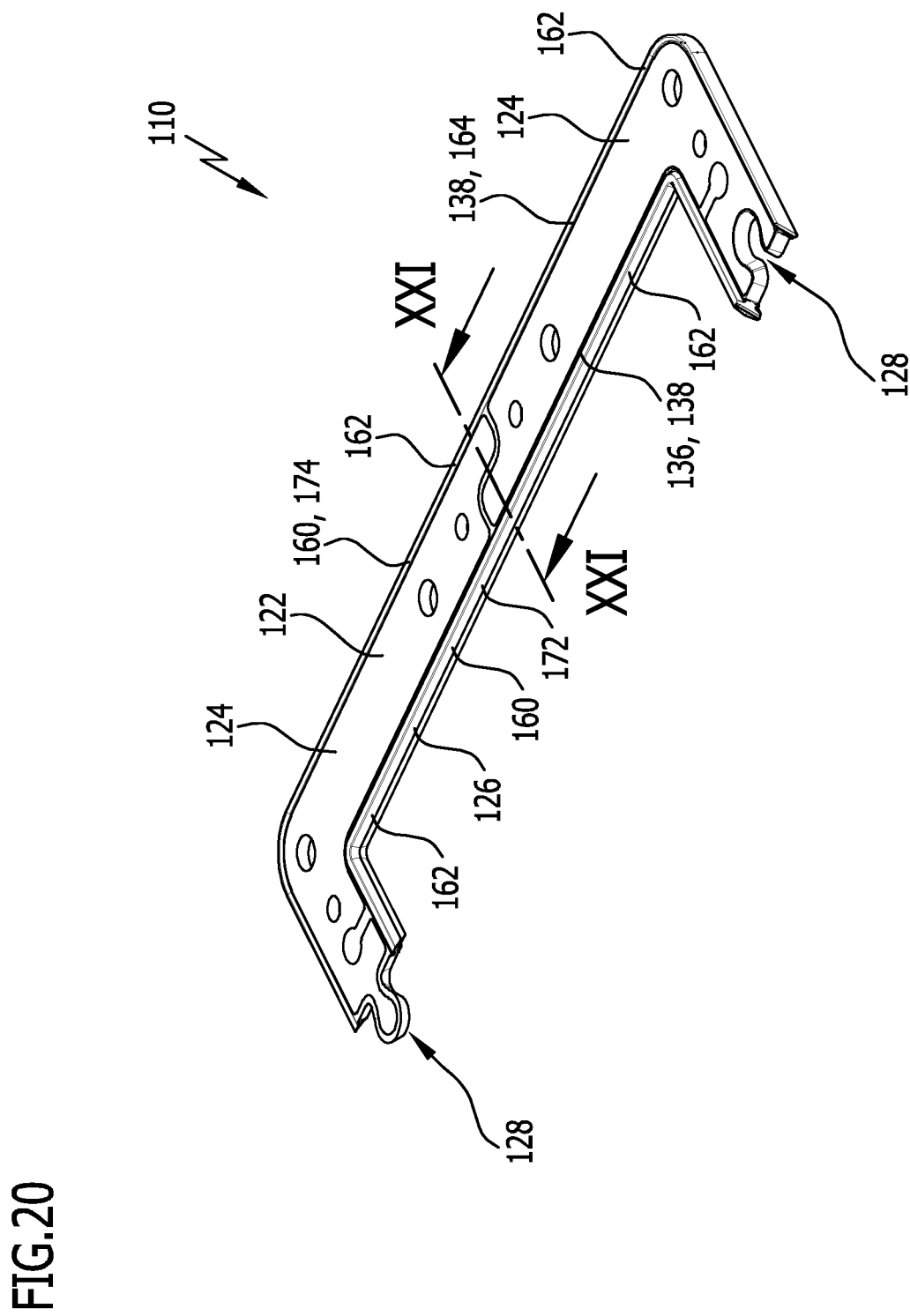
FIG. 20 is a schematic perspective representation of a sealing element component of the embodiment of the sealing element from FIG. 18.
Figure 21:
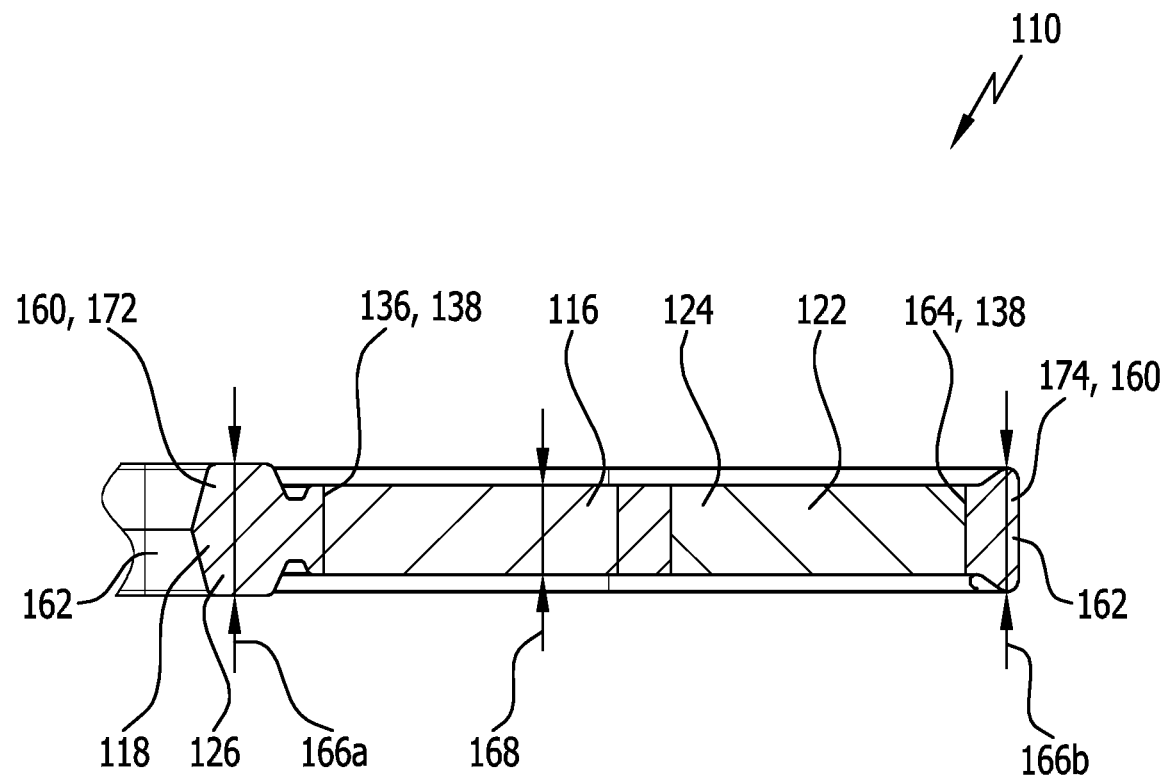
FIG. 21 is a schematic section through the sealing element component from FIG. 20 along the line XXI-XXI in FIG. 20.
Figure 22:
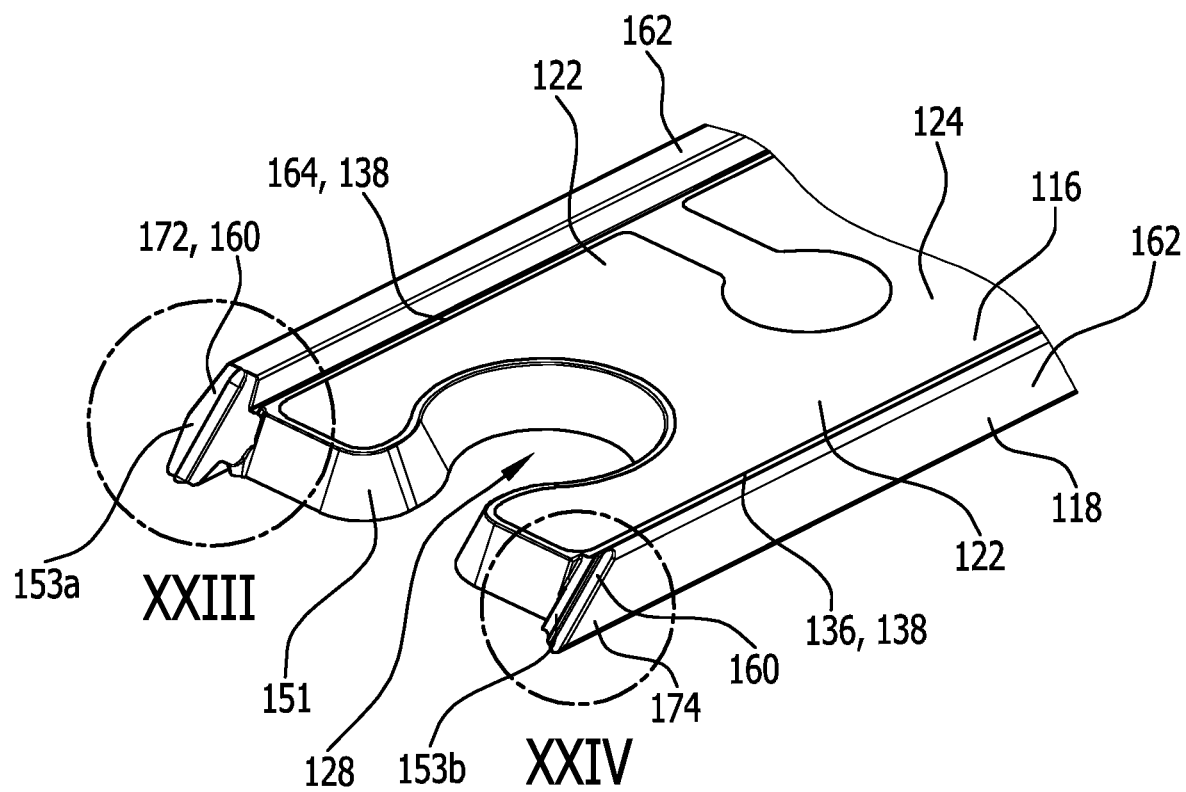
FIG. 22 is a schematic perspective representation of a coupling portion of a sealing element component of the embodiment of the sealing element from FIG. 18.
Figure 23:
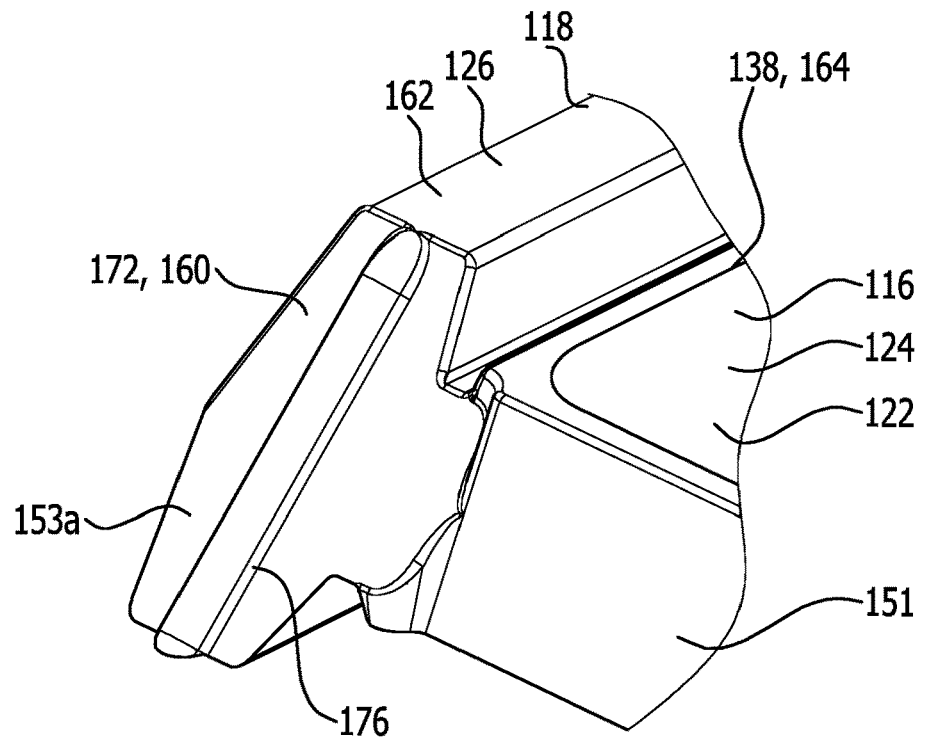
FIG. 23 is an enlarged representation of the region XXIII in FIG. 22.
Figure 24:
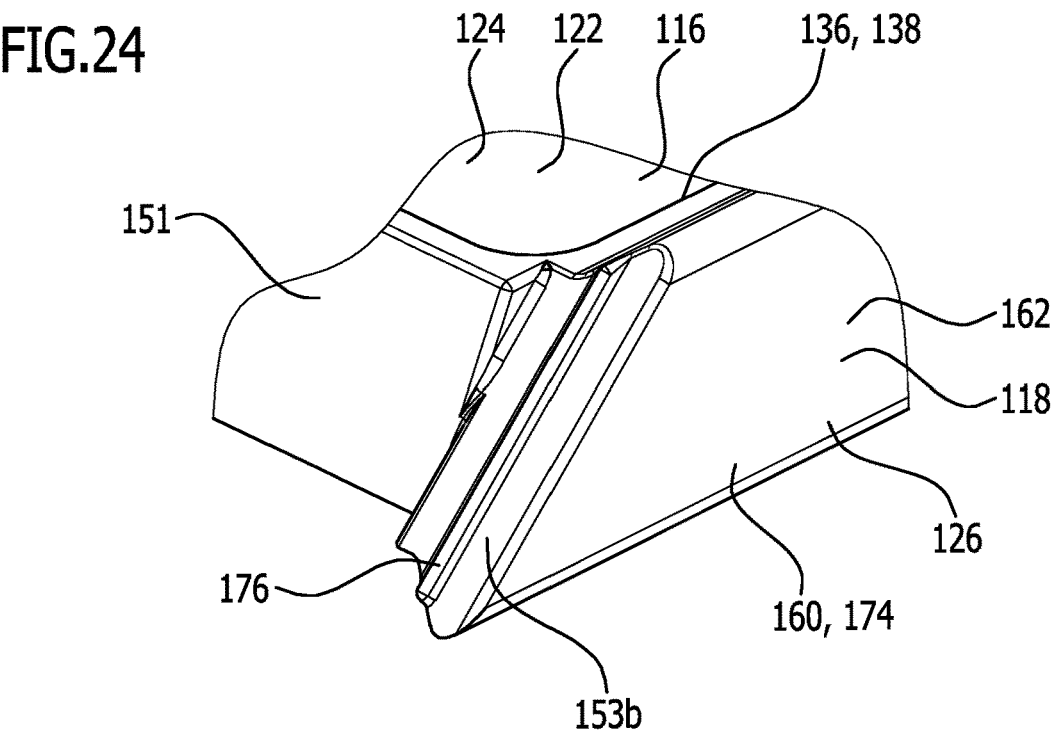
FIG. 24 is an enlarged representation of the region XIV in FIG. 22.

Such coupling portions 146 can be seen clearly in particular in FIG. 5 and in the alternative detailed views in FIGS. 6 to 8.

The coupling portions 146 are designed in particular in such a way that the resilient sealing body parts 126 rest against one another in a sealing manner in the region of the coupling portions 146 when the sealing element components 122 and/or the base body parts 124 are connected to one another, in particular when the sealing element 110 is arranged between the first object 112 and the second object 114.

The coupling portions 146 each have a coupling geometry 148.

Preferably, the coupling portions 146 of the resilient sealing body parts 126 of two sealing element components 122 connected to one another can be placed against one another, in particular can be connected to one another in a sealing manner.

The one or two coupling portions 146 of the resilient sealing body part 126 of a sealing element component 122 preferably each comprise a central coupling portion 151 and an edge coupling portion 153 (cf. FIG. 2).

As can be seen in particular in FIGS. 6 to 8, two resilient sealing body parts 126 each have a mutually complementary coupling geometry 148.

The coupling geometry 148 of the coupling portions 146 has in particular no undercuts in the assembly direction 132 of the sealing element components 122 and/or the base body parts 124.

Preferably, when the base body parts 124 are assembled or connected, the resilient sealing body parts 126 can be placed against one another in a sealing manner in a direction perpendicular or inclined, i.e., transverse, to the main extension plane 130 of the sealing element 110.

In particular, the base body parts 124 with resilient sealing body parts 126 arranged thereon can be connected by means of the connecting portions 128 in the assembly direction 132, without a connection of the base body parts 124 being impeded by undercuts of the coupling geometry 148.

In the embodiment of the sealing element 110 shown in FIGS. 1 to 6, the coupling geometry 148 is designed, for example, as a chamfer 150 or as an inclined surface 152. The chamfer 150 or inclined surface 152 is arranged in particular at an angle β in the range of from approximately 40° to approximately 70° to the main extension plane 130 of the sealing element 110.

In particular, it may be favorable if the chamfer 150 or the inclined surface 152 is arranged at an angle β of approximately 45° to the main extension plane 130 of the sealing element 110 (cf. FIG. 6).

In the embodiments of the coupling portion 146 shown in FIGS. 7 and 8, the coupling geometry 148 is stepped or tiered and has a step 154 (cf. FIG. 7) or two or more steps 154 (cf. FIG. 8). However, it is also conceivable for the coupling geometry 148 to be corrugated.

If a resilient sealing body part 126 is provided in the abutment region 134 only on one base body part 124, preferably no coupling geometry 148 is required.

In the embodiment of the sealing element 110 shown in FIGS. 1 to 8, the resilient sealing body 118 comprises a sealing lip 160 which is arranged on the inner edge 136 of the base body 116.

In an assembled state of the seal arrangement 100, the sealing lip 160 is in particular annularly closed.

The sealing lip 160 preferably protrudes beyond the base body 116 of the sealing element 110, in particular on both sides (cf. FIG. 5), in a direction extending perpendicularly to the main extension plane 130 of the sealing element 110.

It may be favorable if a resilient sealing body part 126 of a sealing element component 122 comprises a sealing lip portion 162.

By means of the edge coupling portion 153, a particularly tight coupling of the sealing lip portions 162 of the resilient sealing body parts 126 of two sealing element components 122 connected to one another can preferably be implemented.

The sealing lip portions 162 of the resilient sealing body parts 126 of the sealing element components 122 of the sealing element 110 preferably each form an annularly closed sealing lip 160 of the resilient sealing body 118 when the seal arrangement 100 is in an assembled state.

In particular, no sealing lip 160 is arranged on an outer edge 164 of the base body 116 in the embodiment of the sealing element 110 shown in FIGS. 1 to 8.

The sealing lip 160 arranged on the inner edge 136 of the base body 116 has a first sealing lip height 166 in a direction perpendicular to the main extension plane 130 of the sealing element 110 (cf. FIG. 5).

The base body 116 has a base body height 168 in a direction perpendicular to the main extension plane 130 of the sealing element 110.

The base body 116 preferably has a base body height 168 in the range of from approximately 1 to approximately 3 mm, in particular in the range of from approximately 1.5 to approximately 2 mm.

The resilient sealing body parts 126 have, in the coupling portion 146, in particular in the central coupling portion 151, in the direction extending perpendicularly to the main extension plane 130 of the sealing element 110, in particular a height 170 which is greater than the base body height 168 in the direction extending perpendicularly to the main extension plane 130 of the sealing element 110.

For example, it is conceivable that the resilient sealing body parts 126 have, in the coupling portion 146, in particular in the central coupling portion 151, in the direction extending perpendicularly to the main extension plane 130 of the sealing element 110, a height 170 which is at least approximately 5%, preferably at least approximately 10%, greater than the base body height 168 in the direction extending perpendicularly to the main extension plane 130 of the sealing element 110.

For example, it is also conceivable that the resilient sealing body parts 126 have, in the coupling portion 146, in particular in the central coupling portion 151, in the direction extending perpendicularly to the main extension plane 130 of the sealing element 110, a height 170 which is at most approximately 20%, preferably at most approximately 15%, greater than the base body height 168 in the direction extending perpendicularly to the main extension plane 130 of the sealing element 110.

The fact that the resilient sealing body parts 126 have, in the coupling portion 146, in particular in the central coupling portion 151, in the direction extending perpendicularly to the main extension plane 130 of the sealing element 110, in particular a height 170 which is greater than a base body height 168 in the direction extending perpendicularly to the main extension plane 130 of the sealing element 110 can preferably make it possible for the resilient sealing body parts 126 of two interconnected sealing element components 122 to be at least partially compressible when the sealing element 110 is arranged between two objects 112, 114.

In particular, the coupling geometries 148 of the coupling portions 146 of the resilient sealing body parts 126 of two sealing element components 122 connected to one another can be placed against one another in a sealing manner.

It may be favorable if the sealing lip height 166 in the direction extending perpendicularly to the main extension plane 130 of the sealing element 110 is greater than the height 170 of the resilient sealing body parts 126 in the coupling portion 146, in particular in the central coupling portion 151.

A height of the resilient sealing body parts 126 in the edge coupling portion 153 in the direction extending perpendicularly to the main extension plane 130 of the sealing element 110 preferably corresponds to the height of the sealing lip 170.

As can be clearly seen in FIGS. 1 and 3, the sealing element components 122 are almost identical.

In the embodiment shown in FIGS. 1 to 8, the sealing element 110 comprises two identical base body parts 124.

The resilient sealing body parts 126 of the sealing element 110 are almost identical, but are designed differently in the abutment region 134, in particular in the region of the coupling portions 146.

A resilient sealing body part 126 is assigned to each base body part 124, so that the number of resilient sealing body parts 126 corresponds in particular to a number of base body parts 124.

An embodiment of the sealing element 110 shown in FIGS. 9 to 17 differs from the embodiment of the sealing element 110 shown in FIGS. 1 to 8 mainly in that an in particular annularly closed sealing lip 160 is arranged not only on the inner edge 136 of the base body 116 but also on the outer edge 164 of the base body 116.

The sealing lip 160 arranged on the inner edge 136 of the base body 116 is in particular a primary sealing lip 172.

The sealing lip 160 of the resilient sealing body 118 arranged on the inner edge 136 of the base body 116 forms in particular a main sealing region of the sealing element 110.

A main sealing function of the sealing element 110 can preferably be provided by means of the sealing lip 160 arranged on the inner edge 136 of the base body 116.

The sealing lip 160 arranged on the outer edge 164 of the base body 116 is in particular a secondary sealing lip 174.

The sealing lip 160 arranged on the outer edge 164 of the base body 116 forms in particular an additional sealing region of the sealing element 110.

An additional sealing function of the sealing element 110 can preferably be provided by means of the sealing lip 160 arranged on the outer edge 164 of the base body 116, in particular in addition to the main sealing function of the sealing lip 160 arranged on the inner edge 136 of the base body 116.

By means of the sealing lip 160 arranged on the outer edge 164 of the base body 116, sealing against splashing water can be implemented, for example.

The sealing lip 160 arranged on the inner edge 136 of the base body 116 preferably has, in the direction extending perpendicularly to the main extension plane 130 of the sealing element 110, a sealing lip height 166*a* which is greater than a sealing lip height 166*b* of the sealing lip 160 arranged on the outer edge 164 of the base body 116 in the direction extending perpendicularly to the main extension plane 130 of the sealing element 110.

In the embodiment of the sealing element 110 shown in FIGS. 9 to 17, the two coupling portions 146 of a resilient sealing body part 126 comprise in particular a central coupling portion 151 and two edge coupling portions 153, in particular an inner edge coupling portion 153*a* and an outer edge coupling portion 153*b* (cf. FIGS. 14 to 17).

In particular, the central coupling portion 151 is arranged between the two edge coupling portions 153*a*, 153*b*.

Sealing lip portions 162 of different sealing element components 122 of the sealing element 110 can preferably be coupled to one another by means of the edge coupling portions 153*a*, 153*b*.

In particular, it is conceivable that sealing lip portions 162 of the sealing lip 160 arranged on the inner edge 136 of the base body 116 can be coupled to one another by means of the inner edge coupling portion 153*a*.

Sealing lip portions 162 of the sealing lip 160 arranged on the outer edge 164 of the base body 116 can preferably be coupled to one another by means of the outer edge coupling portion 153*b*.

The two edge coupling portions 153*a*, 153*b* of the coupling portion 146 preferably comprise one or two additional sealing lips 176. The additional sealing lips are used in particular for sealing in the region of the abutting joint 149.

It may be favorable if the inner edge coupling portion 153*a* comprises two additional sealing lips 176 and/or if the outer edge coupling portion 153*b* comprises two additional sealing lips 176.

Preferably, only the two edge coupling portions 153*a*, 153*b* of a single coupling portion 146 of a resilient sealing body part 126 of a relevant sealing element component 122 comprise an additional sealing lip 176.

It may therefore be favorable if the two edge coupling portions 153*a*, 153*b* of a second coupling portion 146 of the resilient sealing body part 126 of the relevant sealing element component 122 do not comprise an additional sealing lip 176.

Improved sealing in the region of the edge coupling portions 153*a*, 153*b* can preferably be achieved by means of the additional sealing lips 176. In particular, a sealing function of the sealing lips 160, in particular the primary sealing lip 172 and/or the secondary sealing lip 174, can be ensured in the region of the abutting joint 149.

In the embodiment of the sealing element 110 shown in FIGS. 9 to 17, the resilient sealing body parts 126 of the sealing element components 122 preferably each comprise one or more, for example two, positioning projections 178.

The positioning projections 178 of a relevant resilient sealing body part 126 of a sealing element component 122 preferably protrude beyond the base body 116 of the sealing element component 122, in particular in the direction extending perpendicularly to the main extension plane 130 of the sealing element 110.

It may be favorable if all positioning projections 178 of a relevant resilient sealing body part 126 of a sealing element component 122 protrude beyond the base body 116 of the sealing element component 122 on the same side of the sealing element component 122.

The sealing element components 122 and/or the sealing element 110 can preferably be positioned relative to the first object 112 and/or relative to the second object 114 by means of the positioning projections 178.

In particular, the sealing element components 122 are movable in the direction extending parallel to the main extension plane 130 of the sealing element 110, in order to position said sealing element components relative to the first object 112 and/or relative to the second object 114 and/or relative to further sealing element components 122 due to the positioning projections 178 of the resilient sealing body part 126 of a relevant sealing element component 122.

Otherwise, the embodiment of the sealing element 110 shown in FIGS. 9 to 17 corresponds to the embodiment of the sealing element 110 shown in FIGS. 1 to 8, and therefore reference is made to the above description thereof.

An embodiment of the sealing element 110 shown in FIGS. 18 to 24 differs from the embodiment of the sealing element 110 shown in FIGS. 9 to 17 mainly in that each sealing element component 122 comprises a one-piece resilient sealing body part 126 and a plurality of base body parts 124, a plurality of base body parts 124 of the relevant sealing element component 122 being connected to one another by means of the one-piece resilient sealing body part 126 of the relevant sealing element component 122.

All of the base body parts 124 of a relevant sealing element component 122 are preferably connected to one another by means of a single, one-piece resilient sealing body part 126, for example by injection molding the resilient sealing body part 126 onto the base body parts 124.

The base body parts 124 of a relevant sealing element component 122 can preferably be made smaller if a plurality of, for example two, base body parts 124 of a relevant sealing element component 122 are connected to one another by means of the one-piece sealing body part 126. In particular, the base body parts 124 can thus be produced -cost- effectively, for example by punching.

In the embodiment of the sealing element 110 shown in FIGS. 18 to 24, the edge coupling portions 153 preferably comprise only one additional sealing lip 176.

Otherwise, the embodiment of the sealing element 110 shown in FIGS. 18 to 24 corresponds to the embodiment of the sealing element 110 shown in FIGS. 9 to 17, and therefore reference is made to the above description thereof.

Overall, a seal arrangement 100 having a sealing element 110 can be provided, which seal arrangement can be produced in a simple and cost-effective manner and which allows a simple and reliable sealing of a first fluid space 102 from a second fluid space 104.

The invention claimed is:

1. A seal arrangement, in particular for sealing a first fluid space from a second fluid space or a plurality of fluid spaces, comprising a sealing element for arrangement between a first object and a second object, wherein the sealing element comprises two or more sealing element components which can be or are connected directly or indirectly to one another and which each comprise at least two base body parts and a resilient sealing body part arranged on the at least two base body parts, wherein the at least two base body parts of the two or more sealing element components form a preferably dimensionally stable base body of the sealing element, wherein the resilient sealing body parts of the two or more sealing element components form a resilient sealing body for providing a sealing function of the sealing element, wherein the at least two base body parts each comprise one or more connecting portions for connecting the two or more sealing element components to one another, wherein the one or more connecting portions are designed to be complementary to one another in such a way that they engage in one another in a form-fitting manner when the two or more sealing element components are connected to one another, wherein each sealing element component of said two or more sealing element components comprises a one-piece resilient sealing body part and the at least two base body parts, wherein a plurality of the at least two base body parts of a first sealing element component are connected to one another by means of the one-piece resilient sealing body part of the first sealing element component, wherein the plurality of the at least two base body parts of the first sealing element component are not contacted by a base body part of a second sealing element component, wherein no base body part of the second sealing element component is between the at least two base body parts of the first sealing element component.

2. The seal arrangement according to claim 1, wherein the sealing element components can be connected to one another in a puzzle-like and/or form-fitting manner, in particular for producing one or more annularly closed shapes of the base body.

3. The seal arrangement according to claim 1, wherein the sealing element comprises a plurality of identical sealing element components and/or a plurality of identical base body parts and/or a plurality of identical resilient sealing body parts.

4. The seal arrangement according to claim 1, wherein the base body parts can be connected to one another, in particular plug-connected, in a direction perpendicular to a main extension plane of the sealing element.

5. The seal arrangement according to claim 1, wherein the resilient sealing body has one or more sealing lips, in particular a sealing lip arranged on an inner edge of the base body and/or a sealing lip arranged on an outer edge of the base body.

6. The seal arrangement according to claim 5, wherein the sealing lip arranged on an inner edge of the base body has a first sealing lip height in a direction perpendicular to a main extension plane of the sealing element (110), and wherein the sealing lip arranged on an outer edge of the base body has a second sealing lip height in a direction perpendicular to a main extension plane of the sealing element, the first sealing lip height being greater than the second sealing lip height.

7. The seal arrangement according to claim 1, wherein the resilient sealing body parts each comprise one or two coupling portions for coupling mutually abutting or mutually overlapping resilient sealing body parts.

8. The seal arrangement according to claim 7, wherein the one or two coupling portions of a resilient sealing body part comprise a central coupling portion and one or more, in particular two, edge coupling portions.

9. The seal arrangement according to claim 8, wherein the one or more, in particular the two, edge coupling portions of a coupling portion each comprise one or more additional sealing lips, in particular for sealing in the region of an abutting joint.

10. The seal arrangement according to claim 1, wherein the resilient sealing body is arranged on one edge or on a plurality of edges of the base body.

11. The seal arrangement according to claim 1, wherein the resilient sealing body parts each extend along an edge of a base body part, in particular along an edge of an abutment region of the base body parts.

12. The seal arrangement according to claim 1, wherein the resilient sealing body parts of the sealing element components each comprise one or more, for example two, positioning projections.

13. The seal arrangement according to claim 1, wherein the base body has a constant base body height in a direction perpendicular to the main extension plane of the sealing element.

14. The seal arrangement according to claim 1, wherein the resilient sealing body comprises an elastomer material or is made of an elastomer material, the elastomer material preferably being an ethylene acrylate rubber (AEM), an ethylene propylene diene rubber (EPDM), an acrylate rubber (ACM), a fluorine rubber (FKM), a hydrogenated acrylonitrile butadiene rubber (HNBR), a liquid silicone, in particular liquid silicone rubber (LSR), or a silicone rubber (MVQ), in particular a vinyl methyl polysiloxane.

15. The seal arrangement according to claim 1, wherein
   a) the base body is made of a metal base body material or comprises a metal base body material, the metal base body material being in particular steel or aluminum, or
   b) the base body is made of a plastics base body material or comprises a plastics base body material, the plastics base body material being in particular a fiber-reinforced plastics material, for example a glass-fiber reinforced plastics material.

16. The seal arrangement according to claim 1, wherein the base body and/or the base body parts are produced by punching and/or by laser cutting and/or by water jet cutting and/or by manual cutting or in that the base body and/or the base body parts are produced by injection molding.

17. A battery or a control box, in particular for a motor vehicle, comprising the seal arrangement according to claim 1.

18. A motor vehicle comprising said one or more seal arrangements, in particular comprising the battery or the control box according to claim 17.

19. A method for producing a seal arrangement for sealing a first fluid space from a second fluid space or a plurality of fluid spaces, wherein the method comprising: providing a plurality of sealing element components, each of which comprises at least two base body parts and a resilient sealing body part arranged on the at least two base body parts; direct or indirect connection, in particular puzzle-like connection and/or form-fitting connection, of the sealing element components to one another wherein the sealing element components are produced as components which are separate from one another, the resilient sealing body part being molded onto the at least two base body parts in an injection molding process, or the resilient sealing body part being connected to the at least two base body parts by means of compression molding and/or by means of compression transfer molding, wherein, when producing the at least two base body parts, one or more connecting portions are produced for the direct or indirect connection of the sealing element components, wherein the one or more connecting portions are designed to be complementary to one another in such a way that they engage in one another in a form-fitting manner when the sealing element components are connected to one another, wherein each sealing element component of said plurality of sealing element components comprises a one-piece resilient sealing body part and the at least two base body parts, wherein a plurality of the at least two base body parts of a first sealing element component are connected to one another by means of the one-piece resilient sealing body part of the first sealing element component, wherein the plurality of the at least two base body parts of the first sealing element component are not contacted by a base body part of a second sealing element component, wherein no base body part of the second sealing element component is arranged between the at least two base body parts of the first sealing element component.

20. The seal arrangement according to claim 1, wherein the plurality of the at least two base body parts of the first sealing element component are connected directly by a section of the one-piece resilient sealing body part of the first sealing element component, which section sticks to two base body parts of the first sealing element component at their ends, with the ends of these base body parts facing each other.

21. The method according to claim 19, wherein the plurality of the at least two base body parts of the first sealing element component are connected directly by a section of the one-piece resilient sealing body part of the first sealing element component, which section sticks to two base body parts of the first sealing element component at their ends, with the ends of these base body parts facing each other.

* * * * *